Aug. 23, 1966   O. H. CHALKER, JR., ET AL   3,268,870
SYSTEM AND APPARATUS FOR AUTOMATIC DATA COLLECTION
Filed June 27, 1962                                    5 Sheets-Sheet 5

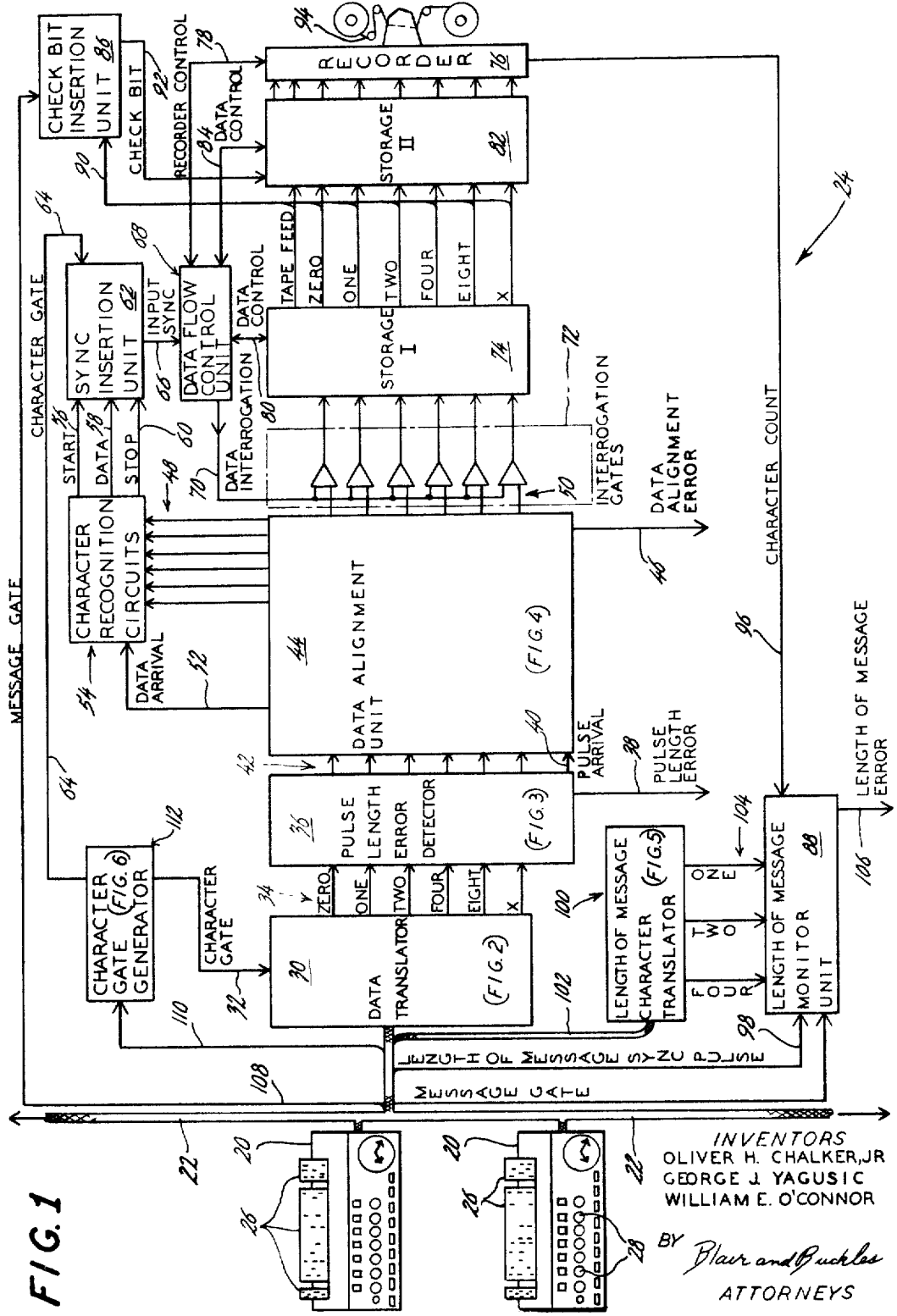

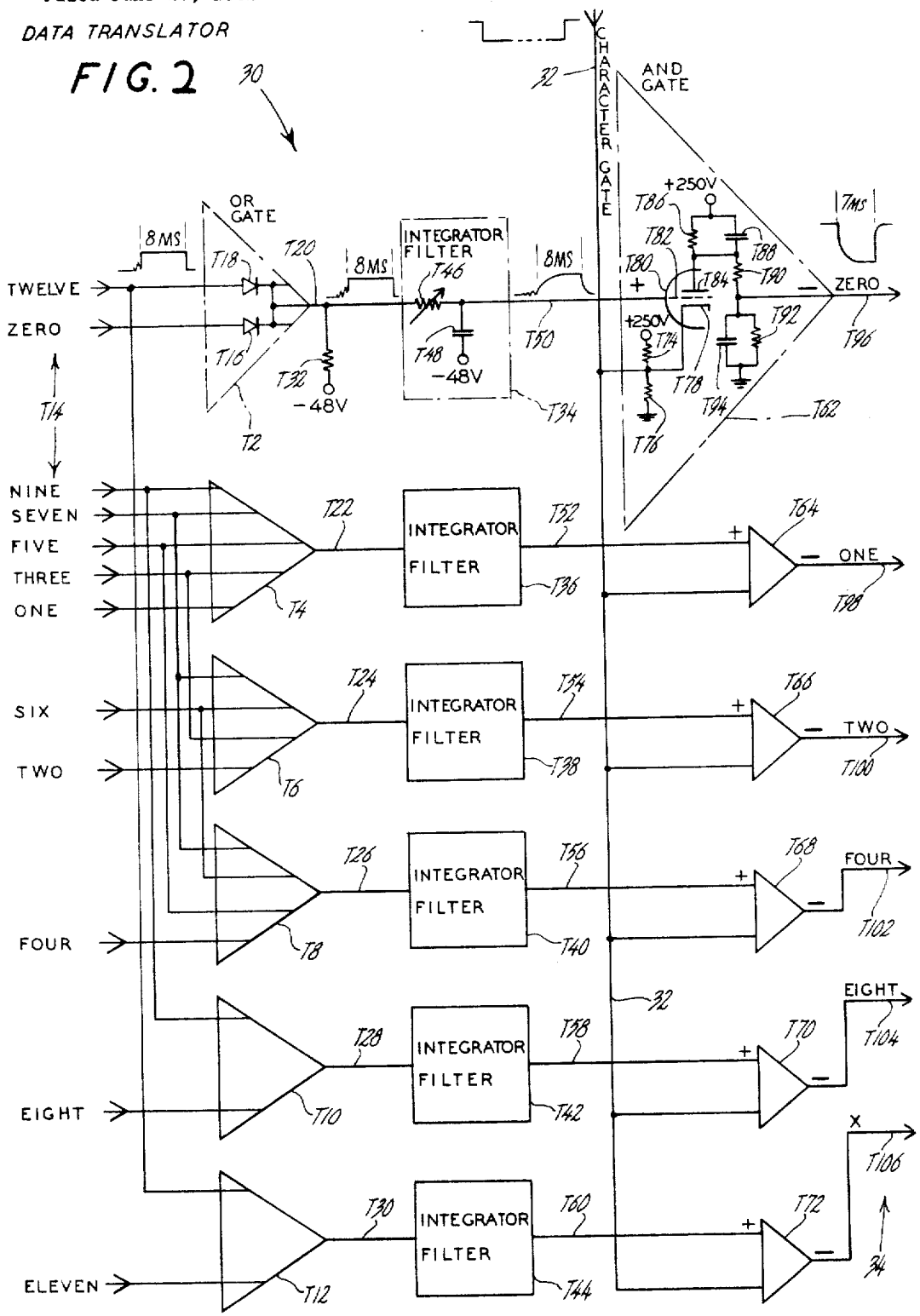

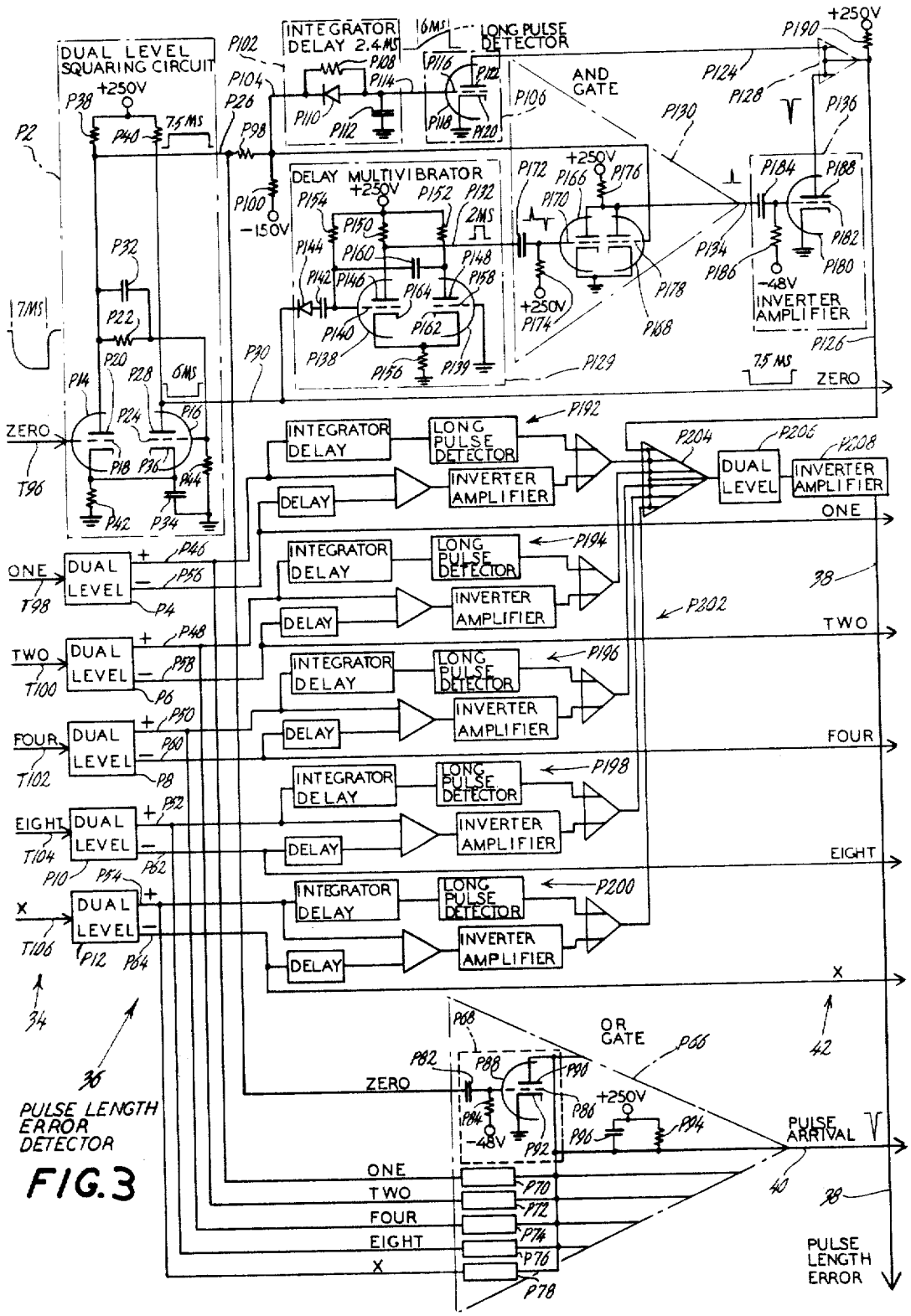

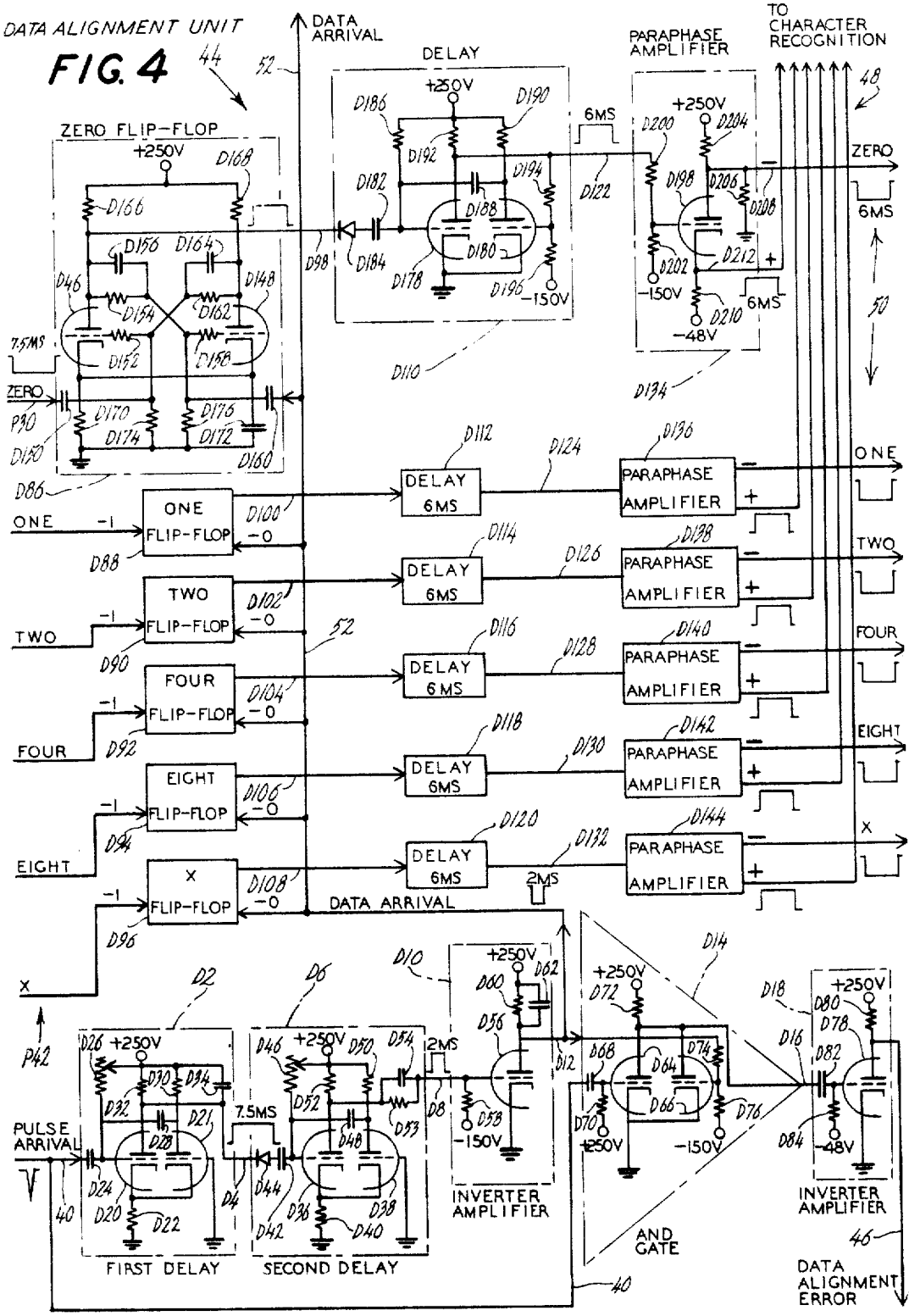

CHARACTER GATE GENERATOR

LENGTH OF MESSAGE TRANSLATOR

United States Patent Office
3,268,870
Patented August 23, 1966

3,268,870
SYSTEM AND APPARATUS FOR AUTOMATIC DATA COLLECTION
Oliver H. Chalker, Jr., and George J. Yagusic, Litchfield, and William E. O'Connor, Northfield, Conn., assignors, by mesne assignments, to Control Data Corporation, Minneapolis, Minn., a corporation of Minnesota
Filed June 27, 1962, Ser. No. 205,659
19 Claims. (Cl. 340—172.5)

INTRODUCTION

This invention relates to a system and apparatus for automatic data collection. More particularly, the invention relates to increasing the rate of data reception and improving the error-detecting capability of a central data receiver in an automatic data collection system.

The data receiver of the present invention is preferably incorporated into the automatic data collection system and apparatus disclosed in the copending applications, Serial No. 863,227, filed December 31, 1959, entitled "System and Apparatus for Automatic Data Collection," said application having been filed by one of the applicants herein, George J. Yagusic, as coinventor with John F. Carragan and Andrew C. Reynolds, Jr., and Serial No. 163,153, filed December 29, 1961, entitled "System and Apparatus for Automatic Data Collection," said application also having been filed by George J. Yagusic. The present application is assigned to the same assignee as the earlier-filed applications.

The automatic data collection system of the above-identified copending applications may be used, for example, in factories where a plurality of data transmitters may be installed in different areas, shops, or departments, for transmission of manufacturing data to a central receiver-recorder which may be located in a central accounting office. Such data may include, for example: the number of units manufactured on particular machines; the designated job orders filed by machine operators; the identity and hourly wage rates of the machine operators; the total time required for each operation, etc. Alternatively, the apparatus of the invention may be used in warehouses and distribution centers for collection of order receipt and delivery time information for inventory control purposes, or in department stores for automatic collection of point of origin sales data, etc.

In a large factory, for example, there is, at present, a great deal of paper work required to be done in the various shops and departments, including such handwritten reports as time tickets for payroll entries, production and inventory control records, cost accounting, quality control inspection and scheduling reports, etc. For automatic central office computing, this mass of data now has to be individually punched into cards by manual operations, and the punched cards have to be verified by human operators before they can be fed to tabulating or computer apparatus. Various systems which have heretofore been suggested for expediting the flow of this information into a central office have included the use of closed-circuit television, which introduces the added problem of human error in reading the data from a TV screen, and the use of intercommunicating telephone circuits, which frequently results in error from misunderstanding of the verbally relayed information. In these prior art systems, the multiplicity of personnel involved results in divided responsibility, which is quite undesirable.

The principle of the data transmission and collection system of the present invention and the above-identified copending applications is to capture the required information at the point of origin, select, sort, and collate it automatically and substantially instantaneously, and then to transmit infallibly the desired data to a central receiver-recorder where it is permanently punched into tape or recorded on some other common language medium which can be fed directly into an automatic computer without further intervention or possibility of human error.

The system and apparatus disclosed in the above-identified copending applications is related to the system and apparatus disclosed in United States Patent No. 2,918,654 of Curtis Hillyer entitled "Automatic Information Transmission," which patent issued December 22, 1959, to the assignee of the present application.

United States patent application Serial No. 841,926, filed September 21, 1959, entitled "Data Transmission Apparatus," discloses a typical transmitter of the system disclosed in the above-mentioned United States applications, Serial Nos. 863,227 and 163,153. Andrew C. Reynolds, Jr., Oliver H. Chalker, Jr., John F. Carragan, and Edward J. Gutowski are the applicants in Serial No. 841,926, and that application is also assigned to the assignee of the present application. Reference should be had to the above applications and patent for details of the operation of the data collection system not important to the invention herein disclosed.

PRIOR ART

In the data collection system described in the above-identified applications and patent, data is communicated from a plurality of outlying transmitters to a central receiver-recorder over a common communication cable. The cable comprises a plurality of data communication circuits or "data lines" over which the characters of each message are transmitted on a parallel character by character basis. The characters are digitally coded. Each character of the code is indicated by simultaneous activity (e.g., presence of system ground potential) on a predetermined combination of the data lines for a predetermined time. Each data line may be considered a communication channel which may either be activated or deactivated (i.e., be at ground potential or at a predetermined bias potential). Activity on a communication channel lasts a relatively short time; about nine milliseconds. Such activity is therefore called a "pulse."

In the systems of the above-identified applications and patents, all of the pulses of each character are transmitted substantially simultaneously and the characters are transmitted at a nominally fixed character transmission rate. However, because the characters are transmitted from a plurality of data transmitters, and because the conditions of transmission vary from transmitter to transmitter, the actual rate of transmission of the characters varies from the nominal transmission rate.

Some of the characters during each transmission originate from punched cards, which are read by a moving read-head passing over the cards during transmission. The read-head carries a plurality of switches activated by holes in the punched cards to change the state of the data communication cable (i.e., ground the appropriate data lines). Because the punched cards may be misaligned with the movement of the moving read-head or the switches of the read-head, the pulses of each character may not be transmitted exactly simultaneously. That is, skewing of the punched cards with respect to the read-head switches results in skewing of the pulses of the characters in time. Furthermore, the contacts of the switches of the moving read-head may tend to bounce. This results in the changeover in state of the corresponding communication channel being noisy and somewhat indeterminate.

In the data communication receiver described in the above-identified applications, Serial No. 863,227 and 163,153, a translator is connected to the data communication channels. The translator translates the characters, transmitted in the code utilized on the punched cards, into a six-channel code suitable for recording on punched tape. After translation, the characters are temporarily stored in a buffer storage unit and are thereafter recorded on punched tape by a mechanical punch.

The mechanical punch is of the synchronous type, that is, it records characters at a fixed rate. When the punch is ready to record a character, it so indicates by a punch request signal and the buffer storage unit then furnishes the character for recording. The buffer storage unit serves to synchronize the reception of the characters at a varying rate as above-described with the recording of the characters at a fixed rate by the punch.

In the translator of the data receiver in the above-identified application, Serial No. 863,227, a plurality of electromechanical filter relays were provided. The filter relays were not responsive to signals of extremely short duration and thus isolated the data receiver from noise signals induced in the communication channels by heavy electrical equipment or the like. The filter relays also convert the rather noisy character pulses (due to read-head switch contact bounce) into relatively precise square pulses.

At the time of filing the above-identified application, Serial No. 863,227, tape punches were commercially available which could be reliably operated at a recording rate of approximately sixty characters per second. Since that time tape punches have become available capable of reliably recording at much higher rates. Also in many installations, it is desirable that some other form of common language recording device be substituted for the punch; for example, a magnetic tape recorder. Many of these devices are capable of recording characters at a much higher rate than sixty characters per second. However, the electromechanical filter relays of the prior data receiver are not capable of operating at rates much greater than sixty characters per second.

In the data collection systems of the above-identified applications and patent, characters are transmitted at approximately seventeen-millisecond intervals. Each pulse of a character has a duration of approximately nine-milliseconds during this period. In the earlier receiver-recorder all of the communication channels from the translator were monitored by a single "OR gate." This produced a signal so long as there was activity on any data line. This signal is the "Data Arrival Signal." In the "Sync Insertion Unit" of the prior data receiver, the data arrival signal was monitored. If its duration was less than five-milliseconds, the character received was not recorded; that is if all the pulses were received during a period of less than five milliseconds. However, it was possible for a pulse on one data channel not to exist for sufficient time to be recorded even though the other pulses were of proper duration. This could result in an erroneous recorded character.

Because of the synchronous operation of the prior data receiver, it was possible when enough misalignment existed between the punched cards and the moving read-head switches that a very late pulse of one character would not be recorded or would be considered as part of the subsequent character. This could lead to further undetected errors. Furthermore, no provision was made in the prior data receiver to detect so-called "long pulse" errors. These could result for example from a read-head switch sticking closed or a data line becoming permanently grounded in a faulty cable. Long pulse errors could lead to a whole series of erroneous characters being recorded and the errors might not be discovered until the punched tape had been read into the user's data processing equipment.

In the "Sync Insertion Unit" of the data receivers disclosed in the above-identified applications, Serial Nos. 863,227 and 163,153, a regenerative loop generated "Input Sync Signals" repetitively when certain conditions were met. This resulted in the recording of a space character by the recording apparatus of the central-receiver.

This regenerative loop was also used to generate "Input Sync" when all channels of the recording medium were filled repetitively to generate a so-called "tape leader." In prior data receivers the regenerative loop was provided for the generation of tape leader even when there was no desire to record space characters. This increased the costs of the data receiver.

OBJECTS

It is therefore an object of the invention to provide a data collection system of increased reliability.

Another object of the invention is to provide a data collection system of the above character having greatly increased error detecting capability.

A further object of the invention is to provide a data collection system of the above character in which the rate of transmission of characters may be greatly increased.

Still another object of the invention is to provide a central-receiver for a data collection system of the above character for receiving characters transmitted on a parallel character-by-character basis.

A further object of the invention is to provide a central-receiver of the above character for accurately receiving noisy pulse signals, and recording definite signals therefrom.

A still further object of the invention is to provide a central-receiver of the above character for receiving multiple pulses indicating an individual character, when the multiple pulses do not occur exactly at the same time.

Yet a further object of the invention is to provide apparatus in a central-receiver of the above character for temporarily storing said non-simultaneous pulse signals indicating a character and for providing a plurality of simultaneous identical pulses at a predetermined time to indicate the character.

Another object of the invention is to provide a data collection system capable of detecting misalignment of the data input medium being read.

Still another object of the invention is to provide in a central-receiver of the above character an error signal when a pulse of excessive duration is received on a data communication cable connected thereto.

Yet another object of the invention is to provide in a central-receiver of the above character an error signal when a pulse of shorter than a predetermined duration is received on a data communication channel connected thereto.

A further object of the invention is to provide in a central-receiver of the above character an error signal when pulses indicating a character are received on the data communication cable over a period of time greater than a predetermined duration.

A still further object of the invention is to provide electronic circuitry in a central-receiver of the above character which simulates the response of an electromechanical relay.

Still a further object of the invention is to provide a multivibrator circuit in a central-receiver of the above character which in response to a first signal produces one output signal, and in response to a different signal produces a series of output signals.

Other objects of the invention will in part be obvious and will in part appear hereinafter.

The invention accordingly comprises the means and features of operation and combinations of functions, and the relation of one or more of such operations and functions with respect to each of the others of the system; and apparatus embodying features of construction, combinations of elements and arrangements of parts which are adapted to effect such operations and functions, all as exemplified in the following detailed disclosure. The scope of the invention will be indicated in the claims.

FIGURES

For a more complete understanding of the nature and objects of the invention, reference should be had to the following detailed description, taken in connection with the accompanying drawings, in which:

FIGURE 1 is an overall block diagram of the preferred embodiment of a data collection system incorporating a data receiver according to the present invention;

FIGURE 2 is a logic block diagram partially in schematic form of the Data Translator shown in FIGURE 1;

FIGURE 3 is a logic block diagram partially in schematic form of the Pulse Length Error Detector shown in FIGURE 1;

FIGURE 4 is a logic block diagram partially in schematic form of the Data Alignment Unit shown in FIGURE 1;

Similar reference characters refer to similar elements in the several views of the drawings.

GENERAL DESCRIPTION

Figure 6:
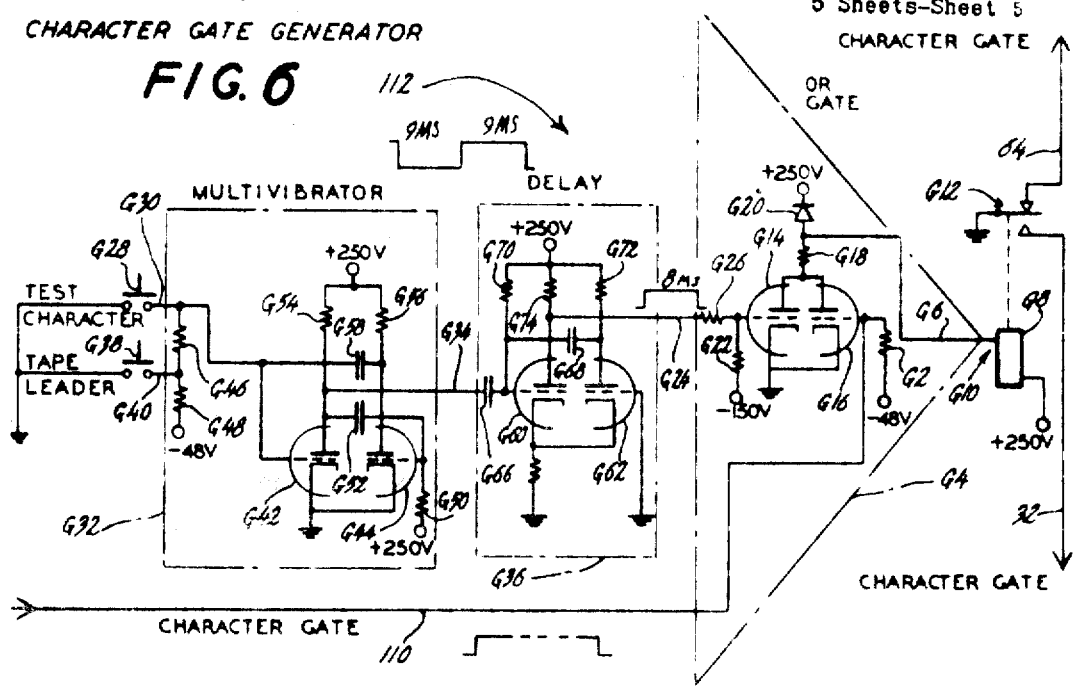
FIGURE 6 is a schematic logic block diagram of the Character Gate Generator shown in FIGURE 1.

The Data Receiver of the present invention comprises a solid state diode translator for translating the characters received from the multipulse parallel binary code in which they are transmitted to the receiver into a six channel "common language" binary code suitable for recording on punched tape, magnetic tape or the like. All electronic circuitry is provided for noise filtering and pulse shaping of the signals after translation. A long pulse and a short pulse monitor is provided for monitoring each common language channel. These monitors provide a long pulse or a short pulse error signal when a signal occurs on a common language channel greater or lesser than a predetermined time duration, respectively.

Means are provided for monitoring all of the common language channels and for producing a "Pulse Arrival" signal upon the initial arrival of each pulse comprising a character. Further means are provided responsive to the "Pulse Arrival" signal for indicating an "alignment" error when a pulse of a character arrives during a predetermined period of time subsequent to the arrival of the first pulse of the character.

An "Alignment Storage Unit" is provided wherein each common language pulse of a character is stored subsequent to short pulse and long pulse monitoring. Means are provided for transferring the character stored in the "Alignment Storage Unit" to the "Buffer Storage Unit" of the data receiver simultaneously at a predetermined time subsequent to a determination that no alignment errror has occurred.

A novel multivibrator is provided which, in response to one signal, acts as a monostable multivibrator and, in response to a different signal, acts as an astable multivibrator. This novel multivibrator is used to generate one control signal for recording a test character or a series of control signals for producing a "tape leader."

A special electronic translator is also provided for translating a "Length of Message Character" transmitted during each message received by the data receiver of the present invention.

SPECIFIC DESCRIPTION

The data collection system

More particularly, referring to FIGURE 1, a data collection system according to the principles of the present invention comprises a plurality of Data Transmitters 20—20 connected by means of a common communication cable 22 to a Data Receiver generally indicated at 24. Punched cards 26 may be inserted into each data receiver. These are, for example, a workman's identification card, a job card, and a machine card, having recorded thereon a punched code, the workmen's number, the job number, and the number of the machine on which the workmen perform the job, respectively. The Data Transmitters 20—20 also comprise a plurality of variable input dials 28 which may be set to record the number of units produced, or introduced into or out of inventory, or the like. The information recorded on the punched cards 26 and set into the Transmitters 20—20 by means of variable dials 28 is transmitted by the Transmitters 20—20 to the Data Receiver 24 over the common communication cable 22 in the manner described in the above identified co-pending applications Serial Numbers 841,926, 863,227, and 163,153. Reference should be had to these co-pending applications for details of the construction and operation of the Data Transmitters 20—20 and their interconnection and intercommunication with the Data Receiver 24 not pertinent to the present invention.

As described in the above identified co-pending applications, each message from the Data Transmitters 20—20 comprises a plurality of data characters. The characters are transmitted to the Data Receiver 24 over the common communication cable 22 in the twelve-channel "Hollerith" code commonly used on punched cards. The twelve communication channels for transmission of the code (twelve "data lines" in the cable 22) are connected to a Data Translator 30. The characters are indicated by simultaneous ground signals on a plurality of the "data lines." These ground signals have a duration of eight-milliseconds and characters are transmitted at a nominal rate of one each seventeen-milliseconds.

A Character Gate Signal is supplied to Data Translator 30 on character gate conductor 32 during reception of characters from the data transmitters 20. When supplied with a Character Gate Signal, the Data Translator translates the received characters into a six-channel common language code and presents the translated characters as seven-millisecond pulses on a combination of its six output data conductors 34. The Data Translator 30 is shown in detail in FIGURE 2 and reference should be had to that figure and to the description of the apparatus shown therein under the heading "The Data Translator" below.

The six output conductor 34 from the Data Translator 30 are connected to a Pulse Length Error Detector 36 wherein each of the conductors 34 is individually monitored for "short pulse" and "long pulse" errors. Whenever a pulse of less than four- or more than twenty-milliseconds duration occurs on any one of the six conductors 34, the Pulse Length Error Detector 36 produces a Pulse Length Error Signal on conductor 38. A Pulse Arrival Signal is provided on conductor 40 by the Pulse Length Error Detector upon the initial occurence of a pulse on any of the data conductors 34.

The Pulse Length Error Detector 36 has six data output conductors 42, each corresponding to one of the six data input conductors 34. It produces a six-millisecond negative square pulse on one of the output conductors 42 whenever a pulse is received on the corresponding input conductor 34.

The Pulse Length Error Detector 36 is shown in detail in FIGURE 3 and reference should be had to that figure and to the description thereof under the heading The Pulse Length Error Detector, below for a more complete description of its apparatus and operation.

The Pulse Arrival Signals on conductor 40 and the characters presented on data conductors 42 are supplied to a Data Alignment Unit 44 (shown in detail in FIGURE 4). This unit stores the pulses of each character supplied to it on conductors 42 until all pulses of the character have arrived. It determines from the pulse arrival signals on conductor 40 whether an alignment error (the arrival of pulses on data conductors 34 over an interval greater than seven and a half milliseconds) has occurred. If one has occurred, it produces a Data Alignment Error Signal on conductor 46. The characters received on input conductors 42 are presented by the Data Alignment Unit 44 as square shaped pulses of six-milliseconds duration on a set of positive output conductors 48 and a set of negative output conductors 50 seven and a half-milliseconds after the first pulse of each character is received thereby.

The Data Alignment Unit 44 produces a Data Arrival Signal on conductor 52. This signal is supplied to Character Recognition Circuits 54 along with the characters presented on positive output conductors 48. From these signals the Character Recognition Circuits 54 produce a Start Signal on conductor 56, a Data Signal on conductor 58, and a Stop Signal on conductor 60. These signals are supplied to a Sync Insertion Unit 62 along with a Character Gate Signal on a conductor 64. The Sync Insertion Unit 62, in manner fully disclosed in the above identified application Serial Number 163,153, produces an Input Sync Signal on conductor 66 four-milliseconds after a character is first presented on output conductors 50 from the Data Alignment Unit 44 or whenever it is desired to record a special "Space" signal.

A Data Flow Control Unit 68 receives the Input Sync Signal on conductor 66 and provides simultaneously a Data Interrogation Signal on conductor 70 in a manner fully described in the above identified application Serial Number 863,227. This results in the character presented on the output conductors 50 of the Data Alignment Unit being set by means of Interrogation Gates 72 into a first storage stage 74 (Storage I). The Data Flow Control Unit is also connected to a synchronous Recorder 76 by means of recorder control cable 78; to Storage I by a data control cable 80 and to a second storage stage (Storage II) by a data control cable 84 in a manner fully described in application Serial Number 863,227. Storage I and Storage II act as a buffer storage unit so that the characters asynchronously presented on output conductors 50 of the Data Alignment Unit 44 may be recorded by the synchronous Recorder 76 on output medium 94.

As further described in the above identified application, Serial Number 863,227, a Check Bit Insertion Unit 86 and a Length of Message Monitor Unit 88 are provided to detect certain types of errors. The Check Bit Insertion Unit 86 monitors over cable 90 the characters being supplied to Storage II and provides a Check Bit Signal on check bit conductor 92 whenever the "parity" of a character differs from a predetermined "parity." The Check Bit Signal insures that the characters supplied to the Recorder 76 all have the same parity. That is, that the number of pulses recorded for each character on the continuous output medium 94 is always even or odd. Thus when the characters recorded on the continuous output medium 94 are read in a user's Data Processing equipment it will be known that any character not having the predetermined "parity" is erroneous.

Figure 5:
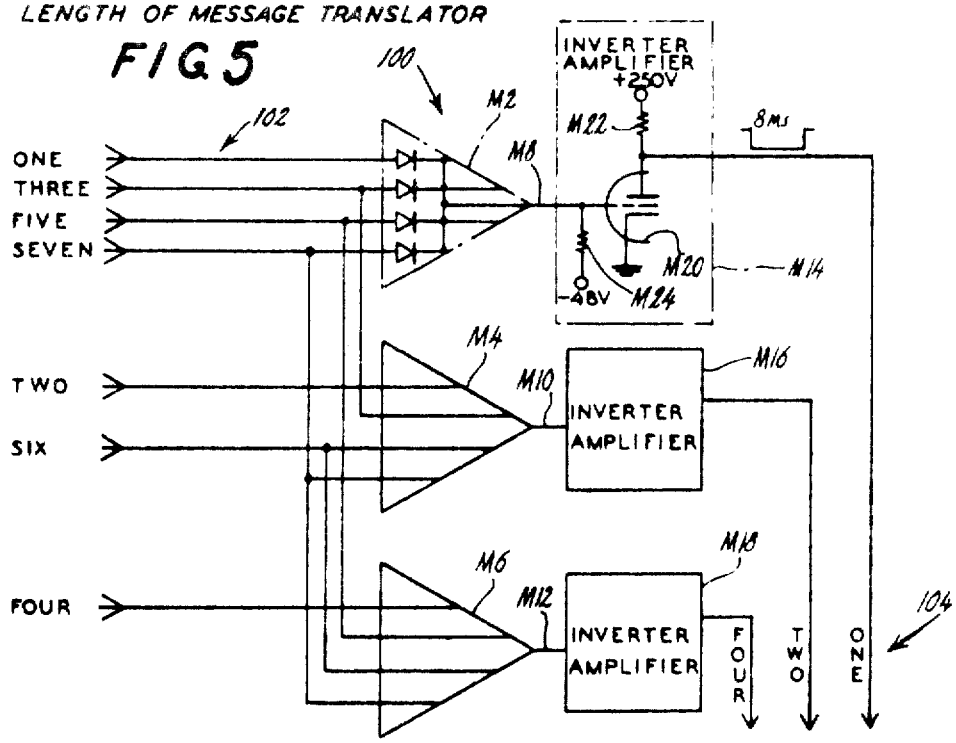
FIGURE 5 is a logic block diagram partially in schematic form of the Length of Message Character Translator shown in FIGURE 1.

The Length of Message Monitor Unit 88 receives a Character Count Signal on conductor 96 from the Recorder 76 each time a character is recovered by the Recorder. The number of these signals during a message from a transmitter 20 is counted by Length of Message Monitor Unit 88. The Length of Message Monitor Unit during each message is supplied with a Length of Message Sync Pulse on conductor 98 when a special "Length of Message Character" is transmitted from the transmitting transmitter 20. This character is translated by a Length of Message Character Translator 100 connected to a selected plurality 102 of the data communication conductors of the common cable 22. The translated length of message character is supplied as a binary number on a modulus eight basis to the Length of Message Monitor Unit 88 on length of message character output conductors 104. If this number differs from the character count provided on conductor 96, the Length of Message Monitor Unit 88 provides a Length of Message Error Signal on conductor 106. Details of the length of Message Character Translator 100 are shown in FIGURE 5, and a detailed description of the apparatus shown therein may be found below under heading The Length of Message Translator.

As fully described in the above identified co-pending application Serial Number 863,227, a Message Gate Signal is supplied by the transmitting Data Transmitter 20 on message gate conductor 108 during transmission of a message to the Data Receiver 24. The Message Gate Signal on conductor 108 is supplied to the Check Bit Insertion Unit 86 and to the Length of Message Monitor Unit 88. This signal controls the operation of these units. The Check Bit Insertion Unit only operates while a message is being received from a Transmitter 20. Termination of the Message Gate Signal causes the Length of Message Monitor Unit 88 to reset its counting circuits at the end of each Transmitter message.

A second gating signal called the "Character Gate Signal" is generated in the transmitting Transmitter 20 on conductor 110 when characters are being transmitted during a message. This signal is utilized by a Character Gate Generator 112 to supply Character Gate signals to the Sync Insertion Unit 62 and the Data Translator 30 on conductors 64 and 32 respectively. The Character Gate Generator shown in detail in FIGURE 6, also generates a short eight-millisecond Character Gate Signal when it is desired to record a test character and a series of eight-millisecond Character Gate Signals when it is desired to generate a "tape leader" at the Recorder 76. The Character Gate Generator 112 is described below in detail under the heading

The Character Gate Generator

It should be understood that the error signals produced by the units of the Data Receiver 24 shown in FIGURE 1—that is the Pulse Length Error Signal on conductor 38, the Data Alignment Error Signal on conductor 46 and the Length of Message Error Signal on conductor 106—may be utilized in the Data Receiver by Error Signalling and Special Function Circuits, such as those described in the copending application Serial No. 863,227, to terminate the transmission then in progress and to record an error character on the output medium 94. An error signal may also be sent to the Data Transmiitter 20 which transmitted the erroneous character and the operator thereof may re-transmit the message after taking any corrective measures required. At the same time a record of the errors and their nature may be kept at the Data Receiver 24 either on the output medium 94 or on counters or the like. Then, if a series of errors of the same type occurs indicating a degradation in system performance, appropriate corrective action can be taken. However, the particular utilization of the various error signals produced by the Data Receiver Recorder 24 shown in FIGURE 1 forms no part of the present invention.

The Data Translator

Now referring to FIGURE 2, the Data Translator 30, comprises a plurality of diode Or gates T2, T4, T6, T8, T10 and T12. The input terminals of these Or gates are connected to various combinations of data conductors T14 of the common cable 22. Or gates are represented herein by a triangle. The input conductors cross the base of the triangle and terminate at the legs. The output conductor originates at the apex. A signal on any input conductor will produce a signal on the output conductor.

There are twelve conductors T14 corresponding to the twelve channels of the "Hollerith" code commonly utilized on punched cards. The characters could, however, be transmitted in other codes, such as the "Remington-Rand" code used on punched cards manufactured by that company in which case the combinations of conductors connected to the Or gates T2 through T12 would be different than that shown in FIGURE 2.

Each Or gate comprises a plurality of diodes, for example, diodes T16 and T18 or Or gate T2. The anode of each diode T16 and T18 is connected to one of the input conductors T14. The diodes are preferably solid state diodes of the type 1N39B. The cathodes of diodes T16 and T18 are connected together and to the output conductor T20 of Or gate T2. The circuits of the remaining Or gates T4 through T12 are similar to that of Or gate T2; the number of diodes being dependent on the number of data conductors T14 connected thereto.

Each Or gate output conductor T20 through T30 is biased at −48 volts D.C. potential through a 47 kilohm plus or minus 5% ½ watt resistor. Only one of these is shown—resistor T32 connected to conductor T20. Thus the data conductors T14 which are normally open circuited at the Data Transmitters 20 (FIGURE 1) are normally biased at −48 volts. When one of the data conductors T14 is grounded for 8 milliseconds to indicate a character, current flows through the diodes connected thereto and the potential on the output conductors of the respective Or gates connected to these diodes rises to ground potential.

In this manner the pulses indicating each character on the data conductors T14 are translated into corresponding pulses on the output conductors T20 through T30.

The conductors T20 through T30 are connected to the input terminals of a plurality of integrator filter circuits T34, T36, T38, T40, T42 and T44. All of the integrator filter circuits are identical. As shown in the schematic of integrator filter T34, they comprise a variable resistor, T46 connected to the input and output terminals of the integrator filter and capacitor T48. One terminal of capacitor 48 is connected to a source of −48 volts D.C. potential and the other terminal is connected to the output terminal of integrator filter T34. Variable resistor T46 preferably comprises a 150 kilohm 5%, ½ watt fixed resistor, connected in series with a 2.5 megohm plus or minus 5%, 2 watt variable resistor. Capacitor T48 is 1000 micromicrofarads.

As will be apparent to those skilled in the art, each integrator filter circuit T34 through T44 will present on its output terminal a signal which is the time integral of the signal presented on its input terminal. Thus an eight-millisecond square wave signal on conductor T20 is converted to the signal on conductor T50 whose wave shape is shown above conductor T50. That is, the potential of conductor T50 will rise from −48 volts to ground potential over an eight-millisecond interval and then fall back to −48 volts as capacitor T48 discharges.

Similarly, integrator filter circuits T36, T38, T40, and T44 present identical signals on their output conductors T52, T54, T56, T58, and T60 when data pulses occur on their input conductors T22, T24, T26, T28 and T30.

Each of the conductors T50 through T60 is connected to an input terminal of a corresponding plurality of two input And gates T62, T64, T66, T68, T70 and T72. The other terminals of these And gates are connected to character gate conductor 32.

And gates are represented in the logic block diagrams herein by triangles. If the circuitry of the And gate is not shown schematically, the input conductors to the And gate terminates at the base and the output conductor originates at the apex thereof. Each and every input conductor to an And gate must carry a predetermined signal before a signal will be presented on the output conductor of the And gate.

The circuits of And gates T62, T64, T66, T68, T70 and T72 are identical. As shown in the schematic of And gate T62, they comprise a voltage divider formed of resistors T74, and T76 connected in series between sources +250 volts D.C. and ground potential. Character gate conductor 32 is connected to the common terminal of resistor T74 and T76. Resistor T74 is 1.5 megaohms and resistor T76 is 200 kilohms, both plus or minus 5%, ½ watt resistors. Thus, character gate conductors 32 is normally biased at approximately +62 volts potential by the voltage dividing action of resistors T74 and T76.

As will be explained in detail below under the heading The Character Gate Generator, whenever the possibility exists of a character being transmitted during a message, character gate conductor 32 is grounded. Since the cathode T78 of a triode T80 preferably one half of a double triode type 5963, is also connected to the common terminal of resistors T74 and T76, this cathode will, when there is no Character Gate Signal, be biased at approximately +62 volts and when a Character Gate Signal is present on conductor 32, be at ground potential. Since the grid T82 of triode T80 is connected to conductor T50, when the cathode T78 is negative (at ground potential) and conductor T50 is at some predetermined potential between −48 volts and ground, triode T80 will conduct.

The plate T84 of triode T80 is connected to divider network comprising: resistor T86, connected between a source of +250 volts D.C. potential and plate T84; capacitor T88, connected in parallel with the resistor T86; resistors T90 and T92, connected in series between plate T84 and a source of ground potential; and a capacitor T94, connected in parallel with resistor T92. Resistor T86 is a 100 kilohm 5%, 1 watt resistor. Resistor T90 is 750 kilohms; resistor T92 is 820 kilohms; both plus or minus 5% rated at ½ watt. Capacitor T88 is .02 microfarads and capacitor T94 is 1000 micromicrofarads. Output conductor T96 is connected to the common terminal of resistors T90 and T92.

When triode T80 is cut off, either because there is no input signal on conductor T50 or there is no Character Gate Signal on conductor 32, output conductor T96 of And gate T62 will be biased at approximately +123 volts D.C. potential due to the voltage dividing action of resistors T86, T90, and T92. Triode T80 conducts when the Character Gate Signal is present on conductor T32 and the data signal on conductor T50 attains a predetermined voltage. Its plate T84 then abruptly drops in potential and capacitor T88 charges. The rate at which capacitor T88 charges is largely determined by its capacitance and the resistance of resistor T76. The charging rate determines the rate at which the potential on output conductor T96 drops.

When the square pulse on conductor T20 terminates, the potential on conductor T50 begins to drop. When the potential on conductor T50 drops below a predetermined potential, triode T80 cuts off. Capacitor T88 discharges largely through resistor T86 and the rate of discharge governs the rate at which the potential on conductor T96 rises.

It will be seen that, in response to a proper eight-millisecond square pulse on conductor T20, integrator filter T34 and And gate T62 coact to produce on output data conductor T96 a slowly dropping, slowly rising negative pulse, initiated one-millisecond after the square pulse on conductor T20 and terminating substantially therewith.

In the same manner And gates T64, T66, T68, T70 and T72 provide output signals on their respective output conductors T98, T100, T102, T104, T106 in response to data signals on their input conductors T52, T54, T56, T58 and T60.

It will be apparent to those skilled in the art that each integrator filter circuit working in combination with an And gate in FIGURE 2 acts as a filter to eliminate high voltage transient signals, "contact bounce" at the beginning of a data pulse, and low voltage signals of long duration on conductor T20. That is, the activating signal on the input conductor to the integrator filter circuit must exist for approximately one millisecond and be of predetermined amplitude for an output pulse to be produced by the associated And gate. Thus, any activity on any conductor T14 having less than predetermined amplitude and duration will not appear on output conductors 34 of the Data Translator 30. It is to be noted that in the preferred embodiment of the invention, variable resistor T46 may be adjusted to filter from two to six milliseconds at the leading edge of the pulse.

The Pulse Length Error Detector

The common language output data conductors 34 from the Data Translator 30 are connected to the Pulse Length Error Detector 36 (FIGURE 1). Referring now to FIGURE 3 the Pulse Length Error Detector 36 comprises a plurality of dual level squaring circuits P2, P4, P6, P8, P10 and P12. The input terminal of each of the dual level squaring circuits is connected to a different one of the six data conductors 34.

All of the dual level squaring circuits are identical and are constructed in accordance with the schematic diagram of dual level squaring circuit P2. These circuits are of the type commonly known as a "Schmitt Trigger Circuit" and comprise a pair of triodes P14 and P16. The triodes are each one half of a type 5963. The "ZERO" conductor T96 from the Data Translator is connected to the grid P18 of triode P14. When there is no signal present on conductor T96, as explained in the discussion of the Data Translator above, conductor T96 will be biased at a potential of approximately +123 volts D.C. Triode T14 will then conduct and its plate P20 will be at a negative potential. Since the plate P20 of triode P14 is connected through resistor P22 to the grid P24 of triode P16, grid P24 will then be at a negative potential and triode P16 will be cut off.

When the seven-millisecond negative pulse is present on conductor T96 driving grid P18 negative, triode P14 will cut off. This will cause its plate P20 to go positive producing an abrupt positive change in voltage on output conductor P26 connected to plate P20. At the same time grid P24 will go positive causing triode P16 to conduct. The plate P28 of triode T16 will therefore go negative producing an abrupt negative change in voltage on output conductor P30 of dual level squaring circuit P2.

Capacitor P32 connected in parallel with resistor P22 aids in abruptly changing the voltage on grid P24 so that the negative going signal on conductor P30 occurs at essentially the same time as the positive going signal on conductor P26. Capacitor P34, connected between ground and the cathode P36 of triode P16, also aids in causing triode P16 to conduct abruptly when the plate P20 of triode P14 goes negative.

The plate P20 and P28 of triodes P14 and P16 are each connected through a resistor P38 and P40, respectively, to a source of +250 volts D.C. potential. The cathode of triode P14 is connected through resistor P42 to ground and the grid P24 of triode P16 is connected through a resistor P44 to ground. Resistors P38 and P40 are each 12 kilohms, resistor P42 is 10 kilohms; all plus or minus 5% rated at 1 watt. Resistor P22 is 470 kilohms, resistor P44 is 330 kilohms, both plus or minus 5%, one half watt resistors. Capacitor P32 is 100 micromicrofarads and capacitor P34 is .005 microfarad.

When the pulse signal on conductor T96 attains a predetermined positive potential, triode P14 will again conduct and triode P16 will abruptly cut off. This will cause an abrupt negative going change in voltage on conductor P26 and an abrupt positive going change in potential on conductor P30. The duration of the resulting positive square pulse signal on conductor P26 and the negative square pulse signal on conductor P30 depends on the duration of the data signal on conductor T96. If that signal is seven-milliseconds then the square pulses on conductors P26 and P36 will be six-milliseconds in duration.

In a similar manner the negative going pulses on conductors T98 and T100, T102, T104, and T106, connected to the dual level circuits P4, P6, P8, P10 and P12 lead to positive square waves on positive output conductors P46, P48, P50, P52, and P54 from the respective dual level circuits and simultaneously to a negative going square wave on the negative output conductors P56, P58, P60, P62 and P64 from the respective dual level circuits.

It will be apparent to those skilled in the art that the dual level squaring circuits (Schmitt Triggers as shown in FIGURE 3) coact with the integrator filter circuits and the And gates (FIGURE 2) connected thereto to simulate the response of electromechanical relays having an energization time of two-milliseconds and a faster de-energization time. Thus, a signal on conductor T20 of FIGURE 2 must be of proper magnitude and of two-milliseconds duration to cause the initiation of an output signal from dual level circuit P2 of FIGURE 3. Furthermore, this output signal, thereafter lasts as long as the signal on conductor T20 and terminates substantially one and one-half-milliseconds thereafter. Also no output signal will be produced from either a high voltage transient or a low voltage signal of long duration on conductor T20. Again referring to FIGURE 3, each of the positive conductors P26, P46, P48, P50, P52 and P54 from the dual level squaring circuits is connected to an input terminal of a six input Or gate P66. Or gate P66 comprises a plurality of differentiating inverter amplifiers P68, P70, P72, P74, P76, and P78. The input terminals of these differentiating inverter amplifiers are each connected to a different one of positive conductors P26, P46, P48, P50, P52, and P54. Their output terminals are all connected to the output conductor 40 of Or gate P66.

All the differentiating inverter amplifiers have the same circuit which is shown in the schematic diagram of differentiating inverter amplifier P68. This circuit comprises a capacitor P82. One terminal thereof is connected in series with input conductor P26. A resistor P84 is connected between the other terminal of capacitor P82 and a source of —48 volts D.C. potential. This terminal of capacitor P82 is also connected to the grid P86 of a triode P88, type 5963. The plate P90 of triode P88 is connected to output conductor 40 and the cathode P92 is connected to ground. Capacitor P82 is 150 micromicrofarads and resistor P84 is 470 kilohms.

The abrupt positively going change in potential on input conductor P26, at the beginning of a square data pulse thereon, gives rise to a positive change in the potential applied to grid P86 due to the differentiating action of capacitor P82 and resistor P84. Triode P88, which is normally cut off, then abruptly conducts. This causes a sharp negative pulse to occur on conductor 40 connected to the plate P90 of triode P88 coincident with the beginning of the six-millisecond square pulse on conductor P26. The plate P90 of triode P88 is connected to a source of +250 volts D.C. potential through a resistor P94 and a capacitor P96, as are the plates of all of the other differentiating inverter amplifiers of Or gate P66. Resistor P94 is 100 kilohms plus or minus 5%, rated at 1 watt and capacitor P96 is .003 microfarad.

In this manner, whenever a pulse occurs on any of the data conductors 34 a negative pulse is produced on pulse arrival conductor 40 indicating the arrival of each pulse of a character. The Pulse Arrival Signal will be utilized in a manner described below under the heading The Data Alignment Unit.

Also connected to the positive output conductor P26 of the dual level squaring circuit P2 are a pair of biasing resistors P98 and P100 connected in series between conductor P26 and a source of —150 volts D.C. potential. The values of resistor P98 and P100 are 2.4 and 1.8 megohms, respectively, plus or minus 5%, rated at ½ watt.

The input terminal of an "integrator delay" circuit P102 is connected to common terminal P104 of resistors P98 and P100. The output terminal of integrator P102 is connected to the input terminal of a "long pulse detector" P106. The integrator delay circuit P102 comprises a resistor P108 and a shunting diode P110 connected in series with terminal P104 and the input terminal of long pulse detector P106. Resistor P108 is 2.4 megohms plus or minus 5%, rated at ½ watt. Diode P110 is of the type known in the art as a silicon-type. A .05 microfarad capacitor P112 is connected between the output terminal of integrator delay P102 and ground.

The positive square wave signal on conductor P26 causes integrator delay P102 to produce on its output conductor P114 a signal of slowly rising potential. If the positive square wave on conductor P26 terminates as it should after six-milliseconds, conductor P114 will immediately drop to the low potential at terminal P104.

Conductor P114 is connected to the grid P116 of a triode P118 in the long pulse detector P106. Triode P118 is type 5963. Its cathode P120 is connected to ground and its plate P122 is connected to output conductor P124.

Triode P118 is normally cut off. The highest potential reached on conductor P114 from the integration of the normal six-millisecond square wave on conductor P26 is not high enough to cause triode P118 to conduct. However, if conductor P26 remains positive for eighteen-milliseconds—this might occur if a switch in the read-head of the transmitting transmitter operates inproperly or if a data conductor of the common cable of the system is short-circuited—conductor P114 will rise to a high enough positive potential to cause triod P118 to conduct. Conductor P124 will then become negative. This will cause conductor P126 connected to conductor P124 at Or gate P128 to go negative, thus indicating that a long pulse error has occured on the ZERO data conductor T96. Because the signal on conductor P26 is not initiated until two-milliseconds after a "transmitted" data signal is first received on a data conductor connected to the "ZERO" Or gate T2 (FIGURE 2), it will be seen that before a long pulse error is indicated, the "transmitted" data signal must exist for at least twenty-milliseconds. This is three-milliseconds longer than the nominal seventeen-milliseconds between the reception of consecutively transmitted data signals.

Short pulse errors are detected by a delay multivibrator P129 connected to the negative output conductor P30 of dual level squaring circuit P2 and an And gate P130 connected to terminal P104 and to the output terminal of delay multivibrator P129. Delay multivibrator P129 produces a two-millisecond positive square pulse on its output conductor P132 in response to and simultaneously with the abrupt negative change in potential on conductor P30. If the two-millisecond square wave on conductor P132 *terminates* at a time when conductor P26 is at its negative potential, a short positive going pulse will occur on output conductor P134 of And gate P130; i.e., if the positive signal on conductor P26 is shorter than two-milliseconds. The positive pulse on conductor P134 is inverted and amplified by inverter amplifier P136 and supplied as one input to Or gate P128. Therefore, a negative signal will occur on output conductor P126 of Or gate P128 whenever either a short pulse or a long pulse error has occured on the ZERO conductor T96 from the Data Translator.

The circuit of delay multivibrator P129 is of the type commonly known as a mono-stable or one shot multivibrator. It comprises triodes P138 and P139, each one half of a double triode, type 5963. The grid P140 of triode P138 is connected through capacitor P142 and diode P144 to conductor P30 on which the negative square wave from dual level squaring circuit P2 occurs. Capacitor P142 is one hundred and fifty micromicrofarads and diode P144 is a solid state diode type 1N39B. The capacitor P142 and diode P144 isolate delay multivibrator P129 from the dual level squaring circuit P2.

Plates P146 and P148 of triodes P138 and P139 are connected through resistors P150 and P152, respectively, to a source of +250 volts D.C. potential. Grid P140 is also connected to this +250 D.C. source through a resistor P154. The cathodes of triodes P138 and P139 are connected together and through a resistor P156 to a source of ground potential. Grid P158 is also connected to ground. Resistor P150 is 27 kilohms plus or minus 5% rated at 2 watts. Resistor P152 is 150 kilohms, resistor P154 is 1.2 megohms, and resistor P156 is 4.7 kilohms; all plus or minus 5% resistors, rated at ½ watt. Grid P140 is connected to plate P148 through a .005 microfarad capacitor P160.

When no signal is present on conductor P30 (i.e., when conductor P30 is at its positive potential) triode P138 will conduct and plate P146 and output conductor P132 connected thereto, will be at some negative potential. Because its cathode P162 is then at a positive potential, triode P139 will be cut off.

During the initial abrupt drop in potential on conductor P30 at the beginning of the negative square wave signal thereon, grid P140 will go negative, instantaneously cutting off triode P138. This will cause plate P146 and output conductor P132, connected thereto, to abruptly go positive.

When triode P138 cuts off, cathode P162 of triode P139 connected to cathode P164 of triode P138 drops to a more negative potential causing triode P139 to conduct. Plate P148 then drops to a more negative potenitial. This condition of triode P138 being cut off and triode P139 conducting continues to exist until capacitor P160 charges through triode P139 to the point where grid P140 becomes positive enough to cause triode P138 to conduct. Plate P146 then drops to a negative potential as does output conductor P132 connected thereto. At the same time cathode P162 rises to a more positive potential cutting off triode P139.

The value of capacitor P160 and resistors P154 and P156 are chosen so that this action takes precisely two-milliseconds, leading to the two-millisecond positive square wave on conductor P132.

And gate P130 comprises triodes P166 and P168 each one half of a type 5963. Grid P170 of triode P166 is connected through a capacitor P172 to conductor P132 and to a source of +250 volts D.C. potential through a resistor P174. The cathodes of triodes P166 and P168 are connected together and to ground. The plates of triodes P166 and P168 are also connected together and through a resistor P176 to a source of +250 volts potential. The plates are also connected to output conductor P134.

Capacitor P172 and resistor P174 differentiate the positive two-millisecond square wave on conductor P132 giving rise to a short positive pulse at the beginning of the square wave and a short negative pulse at the end of the square wave on grid P170.

The triode P166 is normally conducting so that output conductor P132 is normally at slightly above ground potential. Thus, the initial positive pulse on grid P170 has no affect on the plate of triode P166 or the potential on output conductor P134. Grid P178 of triode P168 is connected to terminal P104. Triode P168 is normally cut off, conducting only during the positive portion of the square wave signal at terminal P104. However, since triode P166 is always conducting, the turning of triode P168 on and off by the positive square wave at terminal P104 is not seen on output conductor P134.

If, however, the positive square wave at terminal P104 has a duration of less than two-milliseconds, triode P168 will be cut off at the same time triode P166 is cut off by the negative pulse on its grid P170 at the termination of the positive two-millisecond square wave on conductor P132. The plates of triode P168 and P166 will be positive simultaneously, and this will produce a positive "short pulse error" signal on conductor P134. In this manner any pulse having a duration of less than two-milliseconds on output conductor P26 from the Dual Level Squaring Circuit P2 will give rise to a short pulse error signal on conductor P134. Thus, a "short pulse" on any data conductor T14 (FIGURE 2) is a pulse having a duration of less than four-milliseconds. Capacitor P172 is 100 micromicrofarads, resistor P174 is 1 megohm plus or minus 5% rated at ½ watt, and resistor P176 is 100 kilohms plus or minus 5%, rated at 1 watt.

Inverter amplifier P136 comprises a triode P180 having its grid P182 connected through a capacitor P184 to conductor P134 and, through a resistor P186, to a source of −48 volts D.C. potential. The plate P188 of triode P180 is connected to one input of Or gate P128 and thus through a resistor P190 to a source of +250 volts D.C. potential. Resistor P190 is 200 kilohms plus or minus 5% ½ watt. It acts as the plate resistor for the plate P188 of triode P180 and the plate P122 of triode P118 in long pulse detector P106.

Inverter amplifier P136 inverts and amplifies, the "short pulse error" signal on conductor P134 and supplies it as an output on conductor P126. Capacitor P184 and resistor P186, comprise a coupling circuit that isolates the +250 potential for triodes P166, P168 from the grid of triode P180.

Triode P180 in inverter amplifier P136 is ½ of a type 5963. Capacitor P184 is 500 micromicrofarads. Resistor P186 is 47 kilohms plus or minus 5%, rated at ½ watt.

In summary, the "ZERO" pulse Error Conductor P126 has a negative signal thereon whenever the "ZERO" data conductor T96 from the Data Translator (FIGURE 2) has a data signal thereon of a duration greater than eighteen-milliseconds or less than two-milliseconds (i.e., a long or a short pulse error, respectively). Identical circuits generally indicated at P192, P194, P196, P198, and P200 for detecting long pulse and short pulse errors are connected to dual level circuits P4, P6, P8, P10 and P12.

The pulse length error conductors generally indicated at P202 from these circuits are connected as inputs to a negative Or gate P204 as is conductor P126. That is, all of the conductors P202 and P126 are connected to the input terminal of a dual level circuit P206, a "Schmitt Trigger" circuit similar to dual level squaring circuit P2. When any of the conductors P202 and P126 have a negative signal indicating that a short or a long pulse error has occurred on any of the data conductors 34, dual level circuit P206 produces a positive output square pulse. This pulse is inverted and amplified by inverter amplifier P208, of conventional construction, which produces a negative square pulse signal on its output terminal connected to pulse length error conductor 38.

The negative output conductors P30, P56, P58, P60, P62, P64 of the respective dual level squaring circuits P2–P12 are also the data output conductor 42 which transmit the data character to the Data Alignment Unit 44 (FIGURE 1).

Summing up the operation of the Pulse Length Error Detector shown in FIGURE 3, each of the data conductors 34 from the translator (FIGURE 2) is monitored for short pulse and long pulse errors. Short pulse errors are pulses on conductor 42 having a duration of less than two-milliseconds and long pulse errors are pulses on conductors 42 having a duration greater than eighteen-milliseconds. Whenever a long pulse or a short pulse error occurs, a negative Pulse Length Error Signal is presented on conductor 38. A character is indicated on the data input lines T14 (FIGURE 2) by a combination of pulses nominally eight-milliseconds in duration. These are converted in the Pulse Length Error Detector into square negative pulses of nominally seven and one-half milliseconds duration presented on the appropriate combination of output data conductors 42. The Pulse Length Error Detector also presents a Pulse Arrival Signal on conductor 40 at the initial occurrence of a pulse on any of the output data conductors 42.

*The data alignment unit*

Now referring to FIGURE 4, pulse arrival conductor 40 is connected to the input terminal of a first delay multivibrator D2. Delay multivibrator D2 is preferably adjusted to produce, in response to a Pulse Arrival Signal on conductor 40, a positive going square wave of seven and one half-milliseconds duration on its output conductor D4. Output conductor D4 of delay D2 is connected to the input terminal of a second delay multi-vibrator D6.

The second delay multi-vibrator D6 is adjusted to produce a two-millisecond positive square wave on its output conductor D8 upon the termination of the positive seven and one half-millisecond square wave on conductor D4. This is inverted and amplified by inverter amplifier D10 to produce a two-millisecond negative square wave on its output conductor D12.

Output conductor D12 is connected to one input of a two input And gate D14. The other input of And gate D14 is connected to pulse arrival conductor 40. And Gate D14 is a "negative" And gate. If a negative Pulse Arrival Signal occurs on conductor 40 during the two-millisecond negative square wave on conductor D12, And gate D14 will produce a positive output signal on its output conductor D16. This signal will be inverted and amplified by inverter amplifier D18 and appear as a negative pulse on data alignment error conductor 46.

Normally, if there is little "alignment error" of the pulses in a character, they will all initially arrive at the data receiver during a period of less than seven and one half-milliseconds. The Pulse Length Error Detector of FIGURE #3 will then produce a series of negative pulses on pulse arrival conductor 40 over a period of time of less than seven and one half-milliseconds. The first pulse on Pulse Arrival Conductor 40, corresponding to the first pulse of the character to arrive, will cause delay multivibrator D2 to produce the seven and one half-milliseconds square wave on conductor D4. This will initiate the two-millisecond negative going square wave on conductor D12 precisely seven and one half-milliseconds after the first pulse arrival signal. If all of the pulses of that character arrive within seven and one half-milliseconds no output will be seen on conductor D16 from And gate D14. If however, there is a large amount of alignment error and one of the pulses of the character arrives more than seven and one half-milliseconds after the first pulse of the character, a Pulse Arrival Signal will be present on conductor 40 more than seven and one half-milliseconds after the first pulse arrival signal and this will pass through And gate D14, be inverted and amplified by inverter amplifier D18, and appear as a data alignment signal on conductor 46.

Thus, the duration of the square shaped pulse from first delay D2 defines the permissible period of time from the arrival of the first pulse of a character in which all of the other pulses of the character may arrive. The two-millisecond pulse from 2nd delay D6 defines a period of "invalid entry" during which time, if any pulse of a character arrives, a data alignment error signal is produced on conductor 46. If a pulse arrives more than nine and one half-milliseconds after the "first" pulse, it will not produce an error signal. It will initiate another seven and one half-millisecond delay pulse on conductor D4. Thus, it will be considered the "first" pulse of the next character.

Delay multivibrator D2 and D6 operate in a manner similar to delay multivibrator P129 shown in FIGURE 3. The parameters of the resistors and capacitors thereof being different to establish the duration of their respective output signals.

First delay D2 comprises two triodes D20 and D21 each one half of a double triode, type 5963. The cathodes of triodes D20 and D21 are connected together and through a resistor D22 to ground. The grid of triode D21 is connected to ground and the grid of triode D20, through a capacitor D24, to pulse arrival conductor 40. The grid of triode D20 is also connected through a variable resistor D26 to a source of +250 volts D.C. potential. This grid is further connected through a capacitor D28 to the plate of the triode D21. The plate of triode D21 is connected to a source of +250 volts potential through a resistor D30. The plate of triode D20 is connected through resistor D32 to the source of +250 volts D.C. potential and to conductor D4. Conductor D4 is connected through a capacitor D34 to the source of +250 volts D.C. potential.

The values of the elements of first delay D2 are as follows: capacitor D24 is 50 micromicrofarads; capacitor D28 is .01 microfarad; capacitor D34 is 100 micromicrofarads; resistor D22 is 4.7 kilohms plus or minus 5%, rated at ½ watt; resistor D26 comprises a 200 kilohm fixed resistor and a 2.5 megohm variable resistor connected in series, and resistor D30 is 150 kilohms, all plus or minus 5% rated at ½ watt. Resistor D32 is 27 kilohms, plus or minus 5%, rated at 2 watts.

Delay multivibrator D6 is very similar in construction to delay multivibrator D2. It comprises a pair of triodes D36 and D38, each one half of a double triode type 5963. The cathodes of the triodes D36 and D38 are connected together and through a 4.7 kilohm, plus or minus 5%, ½ watt resistor D40 to ground. The grid of triode D36 is connected through a capacitor D42 and a diode D44 to conductor D4. Capacitor D42 is 150 micromicrofarads and diode D44 is type 1N39B.

The grid of triode D36 is also connected to a source of +250 volts D.C. potential through a variable resistance D46 and to the plate of triode D38 through a capacitor D48. The plate of triode D38 is connected to the source of +250 volts D.C. potential through a resistor D50 and the plate of triode D36 is connected through a resistor D52 to the source of +250 volts D.C. potential. Variable resistance D46 comprises a 400 kilohm fixed resistor and a 2.5 megohm resistor, both plus or minus 5%, rated at ½ watt. Resistor D50 is 150 kilohms, plus or minus 5%, rated at ½ watt and resistor D52 is 27 kilohms, plus or minus 5%, rated at 2 watts. Capacitor D48 is .005 microfarad.

The grid of triode D38 is connected to ground and the plate of triode D36 is connected to output conductor D8 through parallel connected resistor D53 and capacitor D54. Resistor D53 is 1 megohm, plus or minus 5%, rated ½ watt and capacitor D54 is 100 micromicrofarads.

Inverter amplifier D10 comprises one half D56 of a double triode type 5963. The cathode of triode D56 is connected to ground. Its grid is connected through a 750 kilohm plus or minus 5%, ½ watt resistor D58 to a source of −150 volts potential and to conductor D8. Its plate is connected to a source of +250 volts potential through a parallel connected 100 kilohm plus or minus 5%, 1 watt resistor D60 and a 500 micromicrofarad capacitor D62. The plate of triode D56 is also connected to output conductor D12 from inverter amplifier D10.

And gate D14 is very similar in construction to And gate P130 shown in FIGURE 3. And gate D14 comprises a pair of triodes D64 and D66 each one half of a type 5963. The cathodes of triodes D64 and D66 are connected together and to ground. The grid of triode D64 is connected through a 100 micromicrofarad capacitor D68 to pulse arrival conductor 40 and through a 1 megohm plus or minus 5%, ½ watt resistor D70 to a source of +250 volts D.C. potential. The plates of the two triodes D64 and D66 are connected together to output conductor D16 and through a 100 kilohm plus or minus 5%, 1 watt resistor D72 to a source of +250 volts D.C. potential. The grid of triode D66 is connected through a 560 kilohm plus or minus 5%, ½ watt resistor D74 to input conductor D12 from inverter amplifier D10. This grid is also connected through a 1 megohm plus or minus 5%, ½ watt resistor D76 to a source of −150 volts D.C. potential.

Thus, the grids of the triodes D64 and D66 are biased so that when no negative signals are presented on conductors D12 and 40 both triodes conduct. Output conductor D16 connected to their plates is then at a negative potential. Only when both triodes D64 and D66 are cut off will conductor D16 be at a positive potential. Triode D66 will be cut off for the two-millisecond duration of the negative pulse signal on conductor D12. Triode D64 will be cut off only during a sharp negative pulse signal on conductor 40. Thus output conductor D16 will have a positive pulse whenever a pulse arrival signal occurs on conductor 40 during the two-millisecond "invalid entry period" defined by the negative pulse on conductor D12.

Inverter amplifier D18 comprises a triode D78, one half of a type 5963. The cathode of triode D78 is connected to ground. Its plate is connected to data alignment conductor 46 and through a 200 kilohm plus or minus 5%, ½ watt resistor D80 to a source of +250 volts D.C. potential. The grid of triode D78 is connected through a 500 micromicrofarad capacitor D82 to conductor D16 and through a 47 kilohm plus or minus 5%, ½ watt resistor D84 to a source of −48 volts D.C. potential.

The Data Alignment Error Signal on conductor 46 may be utilized by Error Signalling and Special Functions circuitry, as described in the above identified application Serial Number 863,227, to terminate transmission from the transmitter sending the erroneous character and to record special signals on the output medium 94 (FIGURE 1) of the Data Receiver.

The Data Alignment Unit 44 of FIGURE 4 also comprises one storage stage for storing the seven and one-half-millisecond pulses on the data conductors 42 from the Pulse Length Error Detector 36. This storage stage comprises six flip-flops D86, D88, D90, D92, D94 and D96 each connected to one of the data conductors 42.

Each of the flip-flops may be considered to be a switch, controlling the potential on their respective output conductors D98, D100, D102, D104, D106, and D108. The circuits of all the flip-flops are identical to that shown schematically as flip-flop D86.

Now specifically referring to flip-flop D86, a negative signal on "ZERO" conductor P30 results in conductor D98 being set to a positive potential. A negative signal on data arrival conductor 52 results in conductor D98 being set to a negative potential. Thus the initial negative drop in potential on conductor P30 at the initiation of a negative square data pulse will cause conductor D98 to abruptly rise to a positive potential. However, at the end of the square pulse when conductor P30 returns to its "normal" positive potential there will be no effect on flip-flop D86 and conductor D98 will continue to be at the positive potential. Only when conductor 52 goes to a negative potential upon the initiation of the two-millisecond negative square pulse from inverter amplifier D10 (to which conductor 52 is connected) will conductor D98 drop to a negative potential.

Thus, each of the pulses of a "skewed" character will, as it initially arrives, set the flip-flop receiving it, then causing the output conductor of that flip-flop to assume a positive potential. After precisely seven and one half-milliseconds from the initial data pulse arrival, data arrival conductor 52 will go negative and all of the positive signals on the output conductors from the flip-flops will terminate.

A plurality of delay multivibrator D110, D112, D114, D116, D118, and D120 are each connected to one of the output conductors D98 through D108. These delays each produce on their respective output conductors D122, D124, D126, D128, D130 and D132 a positive square pulse of precisely six-milliseconds duration upon the termination of the positive square pulse on conductors D98 through D108 to which they are respectively connected. Thus, the pulses indicating a character on conductors D122 through D132 are all identical, being initiated and terminated at precisely the same time. These pulses are supplied to six paraphase amplifiers D134, D136, D138, D140 and D142, and D144. The paraphase amplifiers amplify six-millisecond square pulses presented thereto and supply negative square pulses of equal duration on their respective negative output conductors 50. These are the data input conductors to the interrogation gates 72 (FIGURE 1).

Upon receipt of a positive square pulse on its input conductor, each paraphase amplifier presents a positive output pulse of equal duration on the positive output conductor 48 connected thereto. Conductors 48 are connected to the Character Recognition Circuits 54 (FIGURE 1) and control the "space insertion" function as described in the above identified co-pending application Serial Number 163,153.

As previously mentioned, all of the flip-flops D86 through D96 have identical circuits as shown schematically for flip-flop D86. This is also true of the delays D110 through D120 and the paraphase amplifiers D134 through D144; these circuits being schematically shown in FIGURE 4 for delay D110 and paraphase amplifier D134, respectively.

Flip-flop D86 comprises a pair of triodes D146 and D148, each one half of a type 5963. Triodes D146 and D148 are connected in circuit to form flip-flop D86 or bi-stable multivibrator as it is sometimes called. This circuit has two stable states. In one state, triode D146 is conducting and triode D148 is cut off. In the other state, triode D146 is cut off and triode D148 conducts. Since conductor P30 is connected to the grid of triode D146 through a capacitor D150 and resistor D152, a negative signal on conductor P30 will cut off triode D146. Conductor D98 connected to the plate of triode D146 will therefore be transferred to a positive potential. The positive potential rise at the plate of triode D146 will be seen by the grid of triode D148 through the parallel connected resistor D154 and capacitor D156 connected in series with grid resistor D158. The induced positive rise in potential at the grid of triode D148 will cause triode D148 to conduct.

The opposite effect is produced by a negative signal on conductor 52. A negative potential drop on conductor 52 is seen by the grid of triode D148 through grid resistor D158 and the series connected capacitor D160. The negative drop in potential induced in the grid of triode D148 cuts off triode D148. This causes the plate of triode D148 to go positive. This positive potential increase is seen by the grid of triode D146 through grid resistor D152 and the parallel connected resistor D162 and capacitor D164 connected in series with resistor D152 and the plate of triode D148. The induced potential rise on the grid of triode D146 causes triode D146 to conduct. This lowers the potential on the plate of triode D146 and output conductor D98 connected thereto.

The plate of triode D146 is connected through plate resistor D166 to a source of +250 volts potential, as is the plate of triode D148 through plate resistor D168. The cathode of triode D146 is connected through cathode resistor D170 to ground and to the cathode of triode D148. A capacitor D172 is connected in parallel with resistor D170. The grid of triode D146 is connected to ground through resistor D152 and resistor D174, as is the grid of triode D148 through resistor D158 and resistor D176. The values of the various resistors of flip-flop D86 are chosen so that the "normal" positive potential on conductor P30 has no affect on the flip-flop. The same is true of the "normal" positive potential on conductor 52.

Thus, only a negative potential on conductor P30 will turn flip-flop D86 on, i.e. produce a positive output signal on conductor D98; and only a negative signal on conductor 52 will turn it off, i.e. produce a negative output signal on conductor D98.

The preferred values of the resistors and capacitors of flip-flop D86 are as follows: capacitors D150 and D160 are each 20 micromicrofarads; capacitors D156 and D164 are each 33 micromicrofarads; capacitor D172 is .005 microfarads; resistors D166 and D168 are each 33 kilohms, plus or minus 5%, and resistor D170 is 22 kilohms, plus or minus 5%, all rated at 1 watt. Resistors D154 and D162 are both 470 kilohms, resistors D152 and D158 are both 10 kilohms and resistors D174 and D176 are both 330 kilohms, all plus or minus 5%, rated at ½ watt.

Delay D110 comprises triodes D178 and D180, each one half of a type 5963. The cathodes of triode D178 and D180 are connected together and to ground. The grid of triode D178 is connected through a capacitor D182 and a diode D184 to conductor D98. Capacitor D182 is 150 micromicrofarads and diode D184 is type 1N39B.

The grid of triode D178 is also connected to a source of +250 volts D.C. potential through a 1 megohm plus or minus 5%, ½ watt resistor D186 and the the plate of triode D180 through a .01 microfarad capacitor D188. The plate of triode D180 is also connected to the source of +250 volts D.C. potential, through a 100 kilohm plus or minus 5%, 1 watt resistor D190. The plate of triode D178 is connected through a resistor D192 of identical value to the source of +250 volts D.C. potential. The plate of triode D178 is connected to the grid of triode D180 through a 1.2 megohm resistor D194; and the grid of triode D180 is connected through a 2.2 megohm resistor D196 to a source of −150 volts D.C. potential. Resistors D194 and D196 are both plus or minus 5% resistors, rated at ½ watt.

Delay D110 is a mono-stable multivibrator and in its quiescent or most stable state, triode D178 is conducting and triode D180 is cut off. When flip-flop D86 is turned off by a negative signal on conductor 52, the grid of triode D178 goes sharply negative, momentarily cutting off triode D178. This causes the plate of triode D178 to go to a more positive potential. This induces a positive potential rise, through coupling resistor D194, on the grid of triode D180 causing triode D180 to conduct. Until capacitor D188 is charged, the grid of triode D178 will be kept at a negative potential because of the negative drop in potential on the plate of triode D180 when triode D180 became conductive. However, when capacitor D188 becomes fully charged, the grid of triode D178 will be biased at a positive potential through resistor D186 and will conduct thus dropping the potential on conductor D122 ending the six-millisecond square positive signal thereon and cutting off triode D180. The charging time of capacitor D188 thus defines the six-millisecond duration of the square positive pulse on conductor D122.

Paraphase amplifier D134 comprises triode D198, ½ of a type 5963. The grid of trode D198 is connected to conductor D122 through a 2.4 megohm resistor D200 and to a source of −150 volts D.C. potential through a 1.8 megohm resistor D202. Resistors D200 and D202 are both plus or minus 5%, rated at ½ watt.

When conductor D122 is at a negative potential, triode D198 is cut off and its plate is biased at a positive potential being connected to a source of +250 volts D.C. through a 100 kilohms plus or minus 5%, ½ watt resistor D204 and to ground through a 200 kilohm plus or minus 5%, ½ watt resistor D206. Since the "ZERO" data output conductor D208 is connected to the plate of triode D198, it is maintained at this positive biased potential in the absence of the positive six-millisecond square pulse on conductor D122. When conductor D122 is positive during the six-millisecond pulse, triode D198 conducts and its plate drops to a negative potential as does the "ZERO" data conductor D208 connected thereto. The cathode of triode D198 is connected through a 47 kilohm plus or minus 5%, ½ watt resistor D210 to a source of −48 volts D.C. potential. When triode D198 is cut off its cathode is therefore at a negative potential. When the triode conducts during the six-millisecond positive pulse on conductor D122, its cathode rises to a more positive potential presenting a six-millisecond positive square pulse on the positive data conductor D212 connected thereto.

Now reviewing the operation of the Data Alignment Unit shown in FIGURE 4, the nominally seven and one-half-millisecond square pulses on data conductors 42 are not all initiated at the same time because the data pulses arriving at the central receiver 24 over the common communication cable 22 do not all arrive at the same time. Each negative pulse on data conductors 42 sets the respective flip-flops D86 through D96. Seven-and-one-half-milliseconds after the arrival of the first pulse on data conductors 42 as determined by the seven-and-one-half-millisecond delay D2, all of the flip-flops D86 through D96 are reset by the initial negative drop of a two-millisecond "Data Arrival Signal" on conductor 52. The flip-flops D86 through D96 which have received pulses then produce a rise in potential on their respective output conductors D98 through D108. The determination of this positive potential causes the respective delays D110 through D120, connected thereto, to produce identical six-millisecond positive square pulses on their output conductors D122 through D132. Paraphase amplifiers D134 through D144 simultaneously produce six-millisecond positive pulses on data conductors 48 connected thereto and appropriate negative six-millisecond square pulses on data conductors 50 connected thereto.

If a pulse of a character arrives more than seven-and-one-half- and less than nine-and-one-half-milliseconds after the first pulse in the character has arrived, a Data Alignment Error Signal will be produced on conductor 46.

As explained above under the heading The Data Collection System and in greater detail in the co-pending applications Serial Numbers 863,227 and 163,153, the characters presented on data conductors 50 are set into the buffer storage unit of the system by a Data Interrogation Signal derived from the Data Arrival Signal on conductor 50. Thereafter they are recorded by the synchronous Recorder.

*The Length of Message Translator*

Now referring to FIGURE 5, the Length of Message Translator 100 comprises three Or gates M2, M4 and M6 connected to selected data conductors 102. The data conductors 102 are connected to the Or gates M2, M4 and M6 such as to translate the number characters one through seven from digital to binary code. For example, the number seven is indicated by a pulse on data conductor "SEVEN." Since data conductor "SEVEN" is connected to Or gates M2, M4, and M6, a pulse on data conductor "SEVEN" produces an output pulse on output conductors M8, M10 and M12 from the three Or gates. The pulses are inverted and amplified by inverter amplifiers M14, M16, and M18 and are presented on the "FOUR," "TWO," and "ONE" output conductors 104 connected to the Length of Message Monitor Unit 88 (FIGURE 1). This is the binary representation of the number seven.

Each of the Or gates M2, M4 and M6 is comprised of solid state diodes, type 1N39B, and operates in an identical manner to the Or gates of the Data Translator shown in FIGURE 2. Inverter amplifier M14, M16 and M18 have identical circuitry, shown schematically for inverter amplifier M14.

Inverter amplifier M14 comprises a triode M20 which is one half of a type 5963. The cathode of triode M20 is grounded and its plate is connected to a source of +250 volts D.C. potential through a 200 kilohm plus or minus 5%, ½ watt resistor M22. The grid of triode M20 is connected to conductor M8 and through a 47 kilohm plus or minus 5%, ½ watt resistor M24 to a source of −48 volts D.C. potential.

*The Character Gate Generator*

The Character Gate Generator is shown in FIGURE 6. Referring now to FIGURE 6, character gate conductor 110 is normally biased at −48 volts potential through a 47 kilohm plus or minus 5%, ½ watt resistor G2. The Character Gate Signal is indicated by grounding the character gate conductor 110 at a Data Transmitter 20. Conductor 110 is connected to one input of an Or gate G4. When conductor 110 is grounded, Or gate G4 produces a negative output signal on its output conductor G6. This energizes coil G8 of relay G10; transferring the grounded transfer contact G12 thereof. Thus, the Character Gate Signal is indicated on character gate conductor 64 by the absence of ground and on character gate conductor 32 by the presence of ground.

Or gate G4 comprises triodes G14, and G16 each one half of a double triode, type 5687. The cathodes of triodes G14 and G16 are connected together and to ground. The plates of triodes G14 and G16 are also connected together and through a 7.5 kilohm plus or minus 5%, 5 watt resistor G18 in series with a diode G20 to a source of +250 volts D.C. potential. Diode G20 may be a Sarkes-Tarzian No. 10 diode. Output conductor G6 is connected to the common terminal of resistor G18 and diode G20. Since one side of the coil G8 is connected to a source of +250 volts D.C. potential and the other side is connected to conductor G6, relay G10 is energized whenever either triode G14 or G16 conducts. Triode G16 conducts when its grid is grounded by a character gate signal on conductor 110 as previously described.

The grid of triode G14 is normally biased at a negative potential through a 750 kilohm plus or minus 5%, ½ watt resistor G22 which is connected to a source of −150 volts D.C. potential. However, an input conductor G24 of Or gate G4 is also connected to the grid of triode G14 through a 1 megohm plus or minus 5%, ½ watt resistor G26. Conductor G24 may be brought to a positive enough potential to cause triode G14 to conduct in a manner now to be described in detail.

When it is desired to record a test character, ground potential is applied to the desired data conductors P14 in the translator shown in FIGURE 2. Referring to FIGURE 2, this leads to the application of a positive signal on the appropriate input conductors T50 through T60 And gates T88 and T64 through T72 due to the action of the integrator filter circuits T34 through T44. If a Character Gate Signal is now applied to character gate conductor 32, the And gates will be opened and the character will be presented on output data conductors 30. The character will then proceed through the rest of the Data Receiver and be recorded on medium 94 in the manner previously described. The Character Gate Signal is generated in the following manner:

A test character push button switch G28 is momentarily closed. This supplies a ground on input conductor G30 to a multivibrator G32 in the Character Gate Generator of FIGURE 6. So long as this ground is applied, multivibrator G32 will produce a negative potential on its output conductor G34. The initial drop in potential on conductor G34 causes a second delay multivibrator G36 to produce an eight-millisecond positive square pulse on conductor G24. This results in character gate relay G10 being energized for a period of eight-milliseconds and a Character Gate ground signal being applied to conductor 32 for the same period. Thus, the test character is presented on the data conductors 34 from the Data Translator and then procedes through the remainder of the Data Receiver in the normal manner above described.

Whenever it is desired to generate "tape leader," that is to repetitively punch all holes in the output medium 94 of the Recorder, all of the data conductors T14 in the Translator of FIGURE 2 are grounded. It is then necessary to generate a repetitive Character Gate Signal on character gate conductor 32. This is accomplished the following way.

When a tape leader push-button switch G38 is closed, ground is applied on input conductor G40 to multivibrator G32. This signal causes multivibrator G32 to generate a signal on conductor G34 which abruptly drops to a lower potential then returns to its former potential after a period of eighteen milliseconds, then again abruptly drops to the lower potential, and so on. Each negative drop in potential on conductor G34 causes delay multivibrator G36 to generate an eight-millisecond positive square wave on its output conductor G24. This, in the manner previously described, leads to an identical signal on character gate conductors 64 and 32.

In this manner, all of the output data conductors 34 from the Translator 30 shown in FIGURE 2 have pulses presented thereon simultaneously at eighteen-millisecond intervals. These signals pass through the remainder of the data circuitry of the Receiver Recorder and result in recording signals in all of the channels of the continuous medium 94. This continues so long as the tape leader switch G38 remains closed.

Multivibrator G32 comprises a pair of triodes G42 and G44 each being one half of a type 5963. The cathodes of the two triodes G42 and G44 are connected together and to ground. The grid of triode G42 is connected through resistors G46 and G48 to a source of −48 volts D.C. potential. Thus, the grid of triode G42 is normally biased negative and the tube is cut off. The grid of triode G44 is connected through resistor G50 to a source of +250 volts D.C. potential and to the plate of triode G42 through a capacitor G52. The plate of triode G42 is also connected to output conductor G34. The plate of triode G42 and the plate of the triode G44 are connected through resistors G54 and G56 respectively to a source of +250 volts D.C. potential. The plate of triode G44 is connected through capacitor G58 to the grid of triode G42. Since the grid of triode G44 is normally biased positively through resistor G50, triode G44 normally conducts.

When the test character switch G28 is closed, grounding the grid of triode G42, triode G42 conducts. This causes the plate of triode G42 to drop to a lower potential and the same is true of conductor G34 connected thereto.

Triode G42 is maintained conducting so long as ground is applied to its grid, that is, so long as test character switch G28 is closed. When the test character switch G28 is released, removing ground from the grid of triode G42, capacitor G58 charges through resistors G48, G46, and G56. After capacitor G58 is charged, the grid of triode G42 is again biased at a negative potential and triode G42 cuts off. The plate of triode G42 therefore becomes more positive as does the output conductor G34 connected thereto.

When tape leader switch G38 is closed, the potential at the grid of triode G42 rises to ground as capacitor G58 charges through resistors G46 and G56. When this potential reaches a predetermined voltage, triode G42 conducts. The potential at the plate of triode G42 drops. Capacitor G52 applies this potential drop to the grid of triode G44 and triode G44 cuts off.

Thereafter, triode G42 conducts and triode G44 remains cut off until capacitor G52 charges, raising the potential at the grid of triode G44 to cause triode G44 to conduct. The potential at the plate of triode G44 then drops, and capacitor G58 applies this sharp drop to the grid of triode G42, cutting off triode G42.

Triode G42 remains non-conducting and triode G44 conducting until capacitor G58 charges, raising the potential at the grid of triode G42. This process repeats itself, with an eighteen-milliseconds period, so long as tape leader switch G38 is depressed. It produces the square wave form on conductor G34 shown thereabove.

The values of the resistors and capacitors of multivibrator G32 are as follows: resistor G46 is 820 kilohms, resistor G48 is 47 kilohms, resistor G50 is one megohm, all plus or minus 5%, ½ watt resistors. Resistors G54 and G56 are both 100 kilohms plus or minus 5%, 1 watt resistors. Coupling capacitor G52 is .02 microfarad and timing capacitor G58 is .005 microfarad.

Delay multivibrator G36 comprises triodes G60 and G62 each being half of a type 5963. The cathodes of triode G60 and G62 are connected together and through a 4.7 kilohm plus or minus 5%, ½ watt resistor G64 to ground. The grid of triode G60 is connected to conductor G34 through a 50 micromicrofarad capacitor G66 and to the plate of triode G62 through a .02 microfarad capacitor G68. The grid of triode G60 is connected to a source of +250 volts D.C. potential through a 1.2 megohm plus or minus 5%, ½ watt resistor G70. The plate of triode G62 is connected through a 150 kilohm plus or minus 5%, ½ watt resistor G72 to the +250 volts D.C. source. The plate of triode G60 is connected to this source through a 27 kilohm, plus or minus 5%, 2 watt resistor G74.

Delay multivibrator G36 operates in the manner previously described with reference to the delay multivibrator illustrated in FIGURES 3 and 4 to produce an eight-millisecond positive square pulse on its output conductor G24 when its input conductor G34 undergoes a negative drop in potential.

Reviewing the operation of the Character Gate Generator, a Character Gate Signal (ground potential) on conductor 110 produces a Character Gate Signal on conductor 32 (ground) and on conductor 64 (absence of ground). These signals are supplied to the Data Translator 30 and the Sync Insertion Unit 62, respectively, of FIGURE 1. A single Character Gate Signal is produced on conductor 32 and 64 of eight-milliseconds duration whenever the test character push-button switch G28 is closed. A plurality of eight-millisecond character gate signals are produced on conductors 32 and 64 at the rate of one each eighteen-milliseconds whenever tape leader push-button switch G38 is closed.

Referring to the Data Translator shown in FIGURE 2, when the test character Character Gate Signal occurs on conductor 32 the data conductors T14 desired to be tested have been grounded and the appropriate And gates T62 through T72 produce output pulses on the output data conductors 34 from the Translator. This results in recording the test character on the record medium 94 (FIGURE 1).

In a similar manner, when tape leader is generated, all of the data conductors T14 of FIGURE 2 are grounded and pulses are repetitively produced on the output data conductors 34 of the Translator. This results in pulses being recorded repetitively in all of the channels of the output medium 94 until the tape leader switch G38 is released.

It will thus be seen that the objects set forth above, among those made apparent from the preceding description, are efficiently attained and, since certain changes may be made in practicing the disclosed method of communication and in the apparatus set forth without departing from the scope of the invention, it is intended that all matter contained in the above description or shown in the accompanying drawings shall be interpreted as illustrative and not in a limiting sense. It is to be understood, for example, that while the preferred embodiment discloses a multiconductor communication cable as the intercommunicating link betwen transmitting stations and the central receiver-recorder, the invention is not so limited but may be employed with other suitable types of communication channels such as, but not limited to, multiple frequency carrier circuits over a common conductor, or radio frequency communication channels which may be either amplitude or frequency modulated. It is further to be understood that while the continuous medium record disclosed herein is punched tape, the invention is equally applicable to magnetic tape, or to any form of record media. Whenever thermionic devices have been disclosed herein, it will be understood that equivalent electronic devices, including solid state devices such as transistors, may be substituted without departing from the invention.

It should also be understood that the various delay times and pulse durations disclosed herein are illustrative of a system wherein the synchronous Recorder 76 records at a rate of sixty characters per second. Different delay times and pulse durations having the relationships disclosed herein would be utilized when recording at a different rate. Similarly the particular times and durations defined as "short" or "long" pulses and as the period of "invalid entry" are illustrative as they depend, not only on the recording rate, but on the transmission characteristics of the Data Transmitter 20—20 as well.

It is further to be understood that the following claims are intended to cover all of the generic and specific features of the invention which, as a matter of language, might be said to fall therebetween. Particularly, it is to be understood that in said claims, elements recited in the singular are intended to include compatible combinations of equivalent elements wherever the sense permits.

Having described our invention, what we claim as new and desire to secure by Letters Patent is:

1. A pulse filter and pulse error detector for filtering and detecting errors in pulses occuring at a data terminal of a data receiver comprising, in combination:
   (A) filter means
      (1) connected to the data terminal, and
      (2) said filter means producing at at least one output terminal thereof a substantially square pulse initiated after a pulse at said data terminal has attained a predetermined potential for a predetermined time
         (a) said square pulse having a duration proportional to the duration of the pulse at said data terminal;
   (B) an integrator circuit
      (1) connected to an output terminal of said filter means, and
      (2) said integrator circuit producing at an output terminal thereof a signal of increasing potential for the duration of each signal occurring on the output terminal of said filter means; and,
   (C) detector means
      (1) connected to the output terminal of said integrator circuit, and
      (2) said detector means producing at an output terminal thereof a long pulse error signal when the potential at the output terminal of said integrator circuit reaches a predetermined potential.

2. The combination defined in claim 1 and
   (D) delay means
      (1) connected to an output terminal of said filter means, and
      (2) said delay means responsive to the initiation of a pulse signal thereon, to produce at a predetermined time thereafter, at an output terminal thereof a delayed signal;
   (E) a two input terminal And gate
      (1) the first terminal thereof connected to the output terminal of said delay means,
      (2) the second terminal thereof connected to an output terminal of said filter means, and
      (3) said And gate producing a short pulse error signal upon receiving said delayed signal and simultaneously not receiving a pulse signal on the output terminal of said filter means connected thereto.

3. A pulse filter and pulse error detector for filtering and detecting errors in pulses occurring at a data terminal of a data receiver comprising, in combination:
   (A) filter means
      (1) connected to the data terminal, and
      (2) said filter means producing at at least one output terminal thereof a substantially square pulse initiated after a pulse at said data terminal has attained a predetermined potential for a predetermined time
         (a) said square pulse having a duration proportional to the duration of the pulse at said data terminal;
   (B) delay means
      (1) connected to an output terminal of said filter means, and
      (2) said delay means responsive to the initiation of a pulse signal thereon, to produce, a predetermined time thereafter, at an output terminal thereof a delayed signal;
   (C) a two input terminal And gate
      (1) the first terminal thereof connected to the output terminal of said delay means,
      (2) the second terminal thereof connected to an output terminal of said filter means, and
      (3) said And gate producing a short pulse error signal upon receiving said delayed signal and simultaneously not receiving a pulse signal on the output terminal of said filter means connected thereto.

4. A data receiver for receiving pulse coded characters, the pulses of said characters occurring nominally simultaneously and nominally at a fixed rate, at a plurality of input terminals of said receiver, comprising, in combination:
   (A) a plurality of integrator circuits
      (1) each having an input and an output terminal,
      (2) the input terminal of each of said integrator circuits connected to a different one of the receiver input terminals, and
      (3) each said integrator circuit producing on its output terminal a signal of increasing potential during the time a signal is supplied to the input terminal thereof;
   (B) a plurality of detector circuits,
      (1) each having an input and an output terminal,
      (2) each of said input terminals connected to a different one of the output terminals of said integrator circuits, and
      (3) each said detector circuit producing at the output terminal thereof a pulse signal initiated when the input signal supplied to the input terminal thereof attains a predetermined potential and terminating substantially when the input signal supplied to the input terminal thereof attains its maximum value;
   (C) a plurality of trigger circuits
      (1) each having an input and at least one output terminal,
      (2) each of said input terminals connected to a different one of the output terminals of said detector circuits, and
      (3) each said trigger circuit producing on the output terminals thereof a substantially square pulse signal, initiated when the potential at the input terminal thereof attains a first predetermined potential and terminated when the said potential thereafter attains a second predetermined potential;

whereby, the pulses supplied to said receiver input terminals are filtered and no output signal is produced on the output terminals of said trigger circuits unless a pulse at said receiver input terminal associated therewith attains a predetermined potential for a predetermined time.

5. The combination defined in claim 4 and:
   (D) a plurality of short pulse detectors
      (1) each having at least one input and an output terminal,
      (2) the input terminals of each of said short pulse detectors connected to a different one of the output terminals of said plurality of trigger circuits, and
      (3) each said short pulse detector producing at the output terminal thereof a short pulse error signal when a pulse of less than a predetermined duration is supplied on the input terminal thereof;

(E) a plurality of long pulse error detectors
(1) each having an input and an output terminal,
(2) the input terminals of each of said long pulse error detectors connected to a different one of the output terminals of said plurality of trigger circuits, and
(3) each said long pulse detector producing on the output terminal thereof a long pulse error signal when a pulse of greater than predetermined duration is supplied on the input terminal thereof.

6. The combination defined in claim 5 and:
(F) Or gate means
(1) the input terminals thereof connected to the output terminals of said long pulse and short pulse error detectors, and
(2) said Or gate means producing at an output terminal thereof a pulse length error signal whenever a long pulse or a short pulse error signal is supplied on an input terminal thereof.

7. The combination defined in claim 5 and:
(F) an Or gate
(1) each input terminal of said Or gate connected to an output terminal of a different one of said trigger circuits, and
(2) said Or gate producing on an output terminal thereof a pulse arrival signal whenever any one of said trigger circuits produces an output pulse; and
(H) alignment error detector means
(1) connected to the output terminal of said Or gate, and
(2) producing a data alignment error signal whenever one signal of a group of pulse arrival signals supplied thereto occurs during a predetermined period of time beginning a predetermined period of time after the first signal of said group of pulse arrival signals.

8. The combination defined in claim 7 and:
(I) signal storage means
(1) having a plurality of input terminals each connected to a different one of the output terminals of said trigger circuits,
(2) having a reset terminal and
(3) having a plurality of output terminals
(a) each corresponding to a different one of said input terminals,
(4) said signal storage means being responsive to reception of a reset signal at said reset terminal to produce output signals on the output terminals thereof when the input terminals corresponding thereto have received pulses since reception of the preceding reset signal at said reset terminal; and,
(J) reset signal producing means
(1) connected to said reset terminal, and
(2) producing a reset signal during said predetermined period of time when said alignment error detector may produce an alignment error signal.

9. The combination defined in claim 8, and:
(K) a plurality of pulse producing devices
(1) each connected to a different one of the output terminals of said signal storage means, and
(2) each having an output terminal and producing thereon, in response to a signal on the output terminal of the signal storage means connected thereto, an output pulse,
(a) said output pulses all having substantially identical characteristics and occurring substantially simultaneously.

10. A data collection system comprising, in combination:
(A) a plurality of data transmitters;
(B) a data receiver;
(C) a multi-channel common communication cable
(1) connecting said data transmitters to said data receiver, and
(2) having a plurality of data communication channels over which data characters are transmitted from said data transmitters to said data receiver on a parallel character by character basis;

and further comprising, in combination, at said data receiver:
(D) a data translator
(1) connected to said data communication channels,
(2) translating the characters received into a common language code, and
(3) said data translator having a plurality of common language output data conductors upon which each translated character is presented as at least one pulse on a predetermined combination thereof;
(E) a plurality of long pulse error detectors
(1) each connected to a different one of said common language data conductors of said translator, and
(2) each having an output terminal and producing thereon a long pulse error signal when a signal of greater than a predetermined time duration is supplied thereto on the common language data conductor of said translator connected thereto;
(F) a plurality of short pulse errors detectors
(1) each connected to a different one of said common language data conductors of said translator, and
(2) each having an output terminal and producing thereon a short pulse error signal when a signal of less than a predetermined time duration is supplied thereto on the common language data conductor of said translator connected thereto;
(G) an Or gate
(1) connected to said common language data conductors, and
(2) said Or gate producing on an output terminal thereof a pulse arrival signal whenever a pulse is initiated on any of said common language data conductors;
(H) a plurality of storage devices
(1) each connected to a different one of said common language data conductors to form an alignment storage unit, and
(2) each having a reset terminal and an output terminal on which an output signal is produced when a reset signal is supplied to said reset terminal if a pulse has been supplied thereto on the said common language data conductor connected thereto;
(I) a first delay device
(1) connected to the output terminal of said Or gate,
(2) producing on an output terminal thereof, upon the occurrence of a first pulse arrival signal, a first delayed signal a predetermined time after the occurrence of said first pulse arrival signal, and
(3) including means inhibiting response to further pulse arrival signals during the period between the occurrence of said first pulse arrival signal and said first delayed signal;
(J) a signal producing device
(1) connected to the output terminal of said first delay device,
(2) said signal producing device producing on an output terminal thereof, in response to said first delayed signal, an output signal;
  (a) said output terminal of said signal producing device being connected to the said reset terminals of said storage devices, and
  (b) said output signal being the said reset signal;
(K) a plurality of pulse producing devices
  (1) each connected to a different one of the output terminals of said storage devices, and
  (2) each having an output terminal and producing thereon, in response a signal on the output terminal of the storage device connected thereto, an output pulse,
    (a) said output pulses all having substantially identical characteristics and occurring substantially simultaneously;
(L) a recording unit
  (1) having a plurality of input terminals
    (a) each said input terminal connected to a different one of the output terminals of said plurality of pulse producing devices, and
  (2) said recording unit recording the characters thereby received on a common language recording medium.

11. The combination defined in claim 10 wherein the output signal produced by said signal producing device (J) exists for a predetermined period of time, and said data receiver further comprises:
(M) a two input terminal And gate
  (1) the first input terminal thereof connected to the output terminal of said Or gate,
  (2) the second input terminal thereof connected to the output terminal of said signal producing device, and
  (3) said And gate having an output terminal on which it produces a data alignment error signal when receiving a pulse arrival signal during reception of a signal from said signal producing device.

12. The combination defined in claim 10 in which said data translator (D) comprises:
(1) a plurality of Or gates
  (a) each connected to a selected plurality of said data communication channels, and
  (b) each having an output terminal on which it produces a signal during the time a signal occurs on any of the data communication channels connected thereto;
(2) a plurality of integrator circuits
  (a) each having an input terminal connected to a different one of the output terminals of said plurality of Or gates, and
  (b) each having an output terminal and producing thereon a signal of increasing potential for the duration of each signal supplied to the input terminal thereof;
(3) a plurality of two input terminal And gates,
  (a) the first terminal of each of said And gates being connected to a different one of the output terminals of said integrator circuits,
  (b) the second input terminal of said plurality of And gates all being connected to a character gate channel of said data communication cable, and
  (c) said And gates when supplied with a signal on their second terminals being responsive to a signal on their respective first input terminals reaching a predetermined potential to thereupon produce on their respective output terminals a pulse signal terminating substantially at the time when the signals on their respective input terminals reach their peak potentials;
(4) a plurality of squaring circuits
  (a) each having an input terminal connected to a different one of the output terminals of said plurality of And gates,
  (b) each having at least one output terminal connected to a different one of said common language output data conductors of said translator,
  (c) each said squaring circuit responsive to a signal on the input terminal thereof reaching a first predetermined potential to thereupon produce an instantaneous change in voltage on an output terminal thereof, and
  (d) each said squaring circuit responsive to the attainment of a second predetermined potential on the input terminal thereof subsequent to the attainment of said first predetermined potential to thereupon instantaneously change the potential on an output terminal thereof back to its original potential.

13. The combination defined in claim 12, and further means at said data receiver for processing test characters and recording tape leader when signals are applied to said data communication channels at said data receiver continuously indicating a predetermined character, comprising, in combination:
(M) a character gate generator for generating short character gate signals
  (1) said short character gate signals being supplied to the second terminals of said plurality of And gates.

14. The combination defined in claim 13, wherein said character gate generator (M) comprises:
(2) a first and a second input terminal, and
(3) means responsive to a signal at said first terminal thereof to generate one of said short character gate signals, and said means also responsive to a signal at said second terminal thereof to generate a series of said short character gate signals repetitively for the duration of reception of said signal at said second terminal thereof.

15. In a data processing system wherein characters are indicated by pulses of at least a predetermined potential for at least a predetermined period of time on a predetermined combination of a plurality of data conductors and the simultaneous occurrence of a character gate signal on a character gate conductor; means for internally generating characters when a predetermined combination of said data conductors have been biased at at least said predetermined potential comprising, in combination:
(A) a plurality of two input terminal And gates
  (1) the first terminal of each of said And gates connected to a different one of the plurality of data conductors
  (2) the second terminal of each of said And gates all connected to the character gate conductor, and
  (3) each said And gate producing a signal on the output terminal thereof when a signal is present on both input terminals thereof, and;
(B) a character gate generator
  (1) connected to said character gate conductor, and
  (2) producing in response to a first signal a character gate signal on said character gate conductor for a period of time at least equal to said predetermined period of time;
whereby, signals are produced on the output conductors of said plurality of And gates simulating the occurrence of a character.

16. The combination defined in claim 15 further defined in that said character gate generator (B):
(3) produces in response to a second signal a plurality of character gate signals on said character gate conductor of said predetermined duration at a fixed repetitive rate;
whereby, pulses are repetitively produced on the output conductors from said And gate repetitively indicating the same character.

17. The combination defined in claim 16 wherein said character gate generator (B) comprises:
(4) a first multivibrator having a first and a second input terminal and an output terminal,
   (a) said first multivibrator in response to a signal on the first input terminal thereof producing a single output signal, and
   (b) said first multivibrator producing in response to a signal on the second input terminal thereof a plurality of output signals at a fixed rate; and,
(5) a second multivibrator having an input and an output terminal,
   (a) the input terminal thereof connected to the output terminal of said first multivibrator
   (b) the output terminal thereof connected to the character gate conductor, and
   (c) said second multivibrator producing on the output terminal thereof a signal of said predetermined duration when a signal is supplied to the input terminal thereof.

18. An electronic circuit for simulating the response of an electromechanical relay having an input terminal and at least one output terminal, comprising in combination:
(A) an integrator circuit having an input and an output terminal,
   (1) the input terminal of said integrator circuit connected to the input terminal of the relay simulator, and
   (2) said integrator circuit producing on the output terminal thereof a signal of increasing potential for the duration of each signal occurring at its input terminal;
(B) a first detector circuit having an input and output terminal,
   (1) the input terminal thereof connected to the output terminal of said integrator circuit, and
   (2) said first detector circuit producing on the output terminal thereof a signal of increasing potential initiated when the input terminal thereof is at a predetermined potential and terminated substantially when an input signal thereto reaches its maximum value; and,
(C) a second detector circuit having an input and at least one output terminal,
   (1) the input terminal thereof connected to the output terminal of said first detector circuit,
   (2) an output terminal thereof connected to an output terminal of said relay simulating circuit, and
   (3) said second detector circuit producing at the output terminals thereof a signal initiated when the potential at the input terminal thereof reaches a predetermined value and terminated when the potential at the input terminal thereof thereafter reaches a second predetermined potential.

19. The combination defined in claim 18 wherein said second detector circuit is a Schmitt trigger circuit.

References Cited by the Examiner
UNITED STATES PATENTS

| | | | |
|---|---|---|---|
| 2,648,835 | 8/1953 | Rench | 340—345 |
| 2,889,548 | 6/1959 | Lubkin | 340—345 |
| 2,910,238 | 10/1959 | Miles | 340—172.5 |
| 2,948,884 | 8/1960 | Guerber | 340—174 |
| 3,040,299 | 6/1962 | Crosby | 340—172.5 |

ROBERT C. BAILEY, *Primary Examiner.*

MALCOLM A. MORRISON, *Examiner.*

R. B. ZACHE, *Assistant Examiner.*